United States Patent
Schmidt

(10) Patent No.: US 7,634,523 B2
(45) Date of Patent: *Dec. 15, 2009

(54) RANDOM NUMBER GENERATORS

(75) Inventor: Douglas C. Schmidt, Severna Park, MD (US)

(73) Assignee: Science Applications International Corporation, San Diego, CA (US)

(*) Notice: Subject to any disclaimer, the term of this patent is extended or adjusted under 35 U.S.C. 154(b) by 862 days.

This patent is subject to a terminal disclaimer.

(21) Appl. No.: 11/281,488

(22) Filed: Nov. 18, 2005

(65) Prior Publication Data

US 2006/0123073 A1 Jun. 8, 2006

Related U.S. Application Data

(63) Continuation of application No. 10/758,433, filed on Jan. 16, 2004, now Pat. No. 7,016,925, which is a continuation of application No. 09/833,684, filed on Apr. 13, 2001, now Pat. No. 6,691,141.

(51) Int. Cl.
*G06F 7/58* (2006.01)

(52) U.S. Cl. .................... 708/250; 708/254
(58) Field of Classification Search .......... 708/250–256
See application file for complete search history.

(56) References Cited

U.S. PATENT DOCUMENTS

| | | | |
|---|---|---|---|
| 5,751,808 A | 5/1998 | Anshel et al. |
| 5,828,752 A | 10/1998 | Iwamura et al. |
| 5,850,450 A | 12/1998 | Schweitzer et al. |
| 6,061,702 A | 5/2000 | Hoffman |
| 6,141,668 A | 10/2000 | Shimada |
| 6,285,761 B1 | 9/2001 | Patel et al. |
| 6,317,686 B1 | 11/2001 | Ran |
| 6,539,410 B1 | 3/2003 | Klass |
| 6,590,462 B1 | 7/2003 | Itahara |
| 6,678,707 B1 | 1/2004 | Butler |
| 2002/0164019 A1 | 11/2002 | Fairclough et al. |

*Primary Examiner*—Tan V Mai
(74) *Attorney, Agent, or Firm*—Banner & Witcoff, Ltd.

(57) ABSTRACT

A method and apparatus are provided for generating a parameter value to be used as a parameter for a random number generator. A random value is generated and the random value is mapped to a prime number. The parameter value is generated by multiplying the prime number by previously selected prime numbers. Each parameter value is then used as one of a plurality of parameters for the random number generator.

39 Claims, 14 Drawing Sheets

RANDOM NUMBER GENERATORS

CROSS REFERENCE TO RELATED APPLICATION

This application is a continuation application of application Ser. No. 10/758,433, filed Jan. 16, 2004, and entitled Random Number Generators, which is a continuation application of U.S. Pat. No. 6,691,141, issued Feb. 10, 2004, and entitled Method And Apparatus For Generating Random Number Generators, each of which is herein incorporated by reference in its entirety for all purposes.

FIELD OF THE INVENTION

Aspects of this invention pertain to the field of random number generators. More particularly, this invention pertains to generating parameters for a large number of random number generators.

BACKGROUND OF THE INVENTION

FIG. 1 illustrates a cryptologically weak random number generator (CWRNG) 100. Examples of CWRNG's are a linear congruential random number generator (LRNG) and a quadratic congruential random number generator (QRNG). Random number generators are widely used in cryptographic applications, such as for encrypting digital computer messages transmitted over a network.

LRNG's are recursions in x of a form $x_{i+1}=(a*x_i+b) \% c$, where * denotes multiplication and % denotes a modulo function. For example, $(a*x_i+b) \% c$ would produce an integer in a range of 0 to (c−1). a, b and c, the LRNG parameters, along with $x_0$, the LRNG starting value determine succeeding values of x. The LRNG will cycle through all numbers in the range from 0 to c−1 in pseudo-random order before repeating (i.e. it has a period of c, the maximum period), if and only if:
1. b is relatively prime to c (that is, no prime factors of c are prime factors of b);
2. (a−1) is a multiple of p for every prime number p dividing c; and
3. (a−1) is a multiple of 4 if c is a multiple of 4.

Further, in order to prevent (a−1) from being a predictable value, c should not divide evenly into (a−1). This can be accomplished by imposing a fourth rule as follows:
4. at least one prime factor in c is raised to a power greater than 1 and the same prime factor used in (a−1) must be raised to a power less than the power used to raise that prime factor in c.

QRNG's are recursions in x of a form $x=(d*x*x+a*x+b) \% c$, which generates a series of integers in a range from 0 to (c−1). a, b, c and d, the QRNG parameters, along with x0, the QRNG starting value determine the succeeding values of x. A QRNG will cycle through all numbers in a range of 0 to (c−1) in psuedo-random order before repeating (i.e. it has a period of c, the maximum period), if and only if:
1. b is relatively prime to c;
2. d and (a−1) are both multiples of p for every odd prime number p dividing c;
3. d is even and d is congruent to (a−1) % 4 if c is a multiple of 4;
4. d is congruent to (a−1) % 2 if c is a multiple of 2; and
5. either d % 9=0 or a % 9=1 and (b*d) % 9=6 if c % 9=0.

Further, in order to prevent (a−1) and d from having predictable values, c should not divide evenly into (a−1) and d.

While LRNG's and QRNG's provide a fast and efficient method for generating quasi-random numbers, they have certain disadvantages. An outside observer can determine succeeding outputs from either a LRNG or a QNRG after observing a short sequence of outputs.

FIG. 2 shows a two-stage random number generator, which includes a cryptologically weak random number generator 100 with an output stream 110. The output stream may be encrypted by a block encryptor 210 making it difficult for an outside observer to successfully attack this system by observing the output 212 of the block encryptor 210.

Random number generators may be used in a communication system (e.g., Internet) where large numbers of random number generators may be used and frequently re-keyed to provide security to communications occurring in the system by, for example, providing security keys for encrypting and decrypting such communications.

Data in a communication system is placed in packets. Each packet is sent from a source to a destination and may pass through one or more intermediate locations before reaching its destination. The security keys allow for the data to be encrypted at the source and decrypted at the destination, such that an unintended recipient, for example, a hacker monitoring one of the intermediate locations, is unable to decrypt the data contained in the packets because he does not possess the security keys.

Random numbers generated by cryptologically weak random number generators will eventually repeat. The repeating numbers are in an easily guessable sequence of random numbers. The cryptologically weak random number generator, the encryptor or both, should be re-keyed well before the sequence repeats.

The time for re-keying the cryptologically weak random number generator should be short for two reasons: (1) a system crash will make the re-keying of many cryptologically weak random number generators necessary and slow re-keying would effectively extend an outage; and (2) re-keying is non-productive overhead for a system during normal "sunny day" operation of the system. As such, it is appropriate to limit this overhead to be at most x percent of the system's resources. The overhead is limited to x percent of the system's resources when:

$$T<=0.01x\ c/p, \quad (1)$$

where T is the time to re-key in seconds, c is the number of packets transmitted between re-keys (directly proportional to cycle length) and p is the maximum speed of the data in packets per second. For instance, if x=0.1, c=1,000,000 packets, and p=100,000 packets per second, then T can be at most 10 milliseconds, with re-keying occurring every 10 milliseconds. Typically, cryptologically weak random number generators, such as linear congruential random number generators (LRNG's) and quadratic congruential random number generators (QRNG's) can be combined to achieve a long cycle. Therefore, re-keying after a crash is a limiting constraint.

The re-keying should yield practically unguessable random number generators. The parameters for the random number generator should not exhibit a strong bias that would make them easily determined by an observer. For instance, if the parameters for a ten parameter cryptologically weak random number generator were restricted to being one of the 6,542 primes between 2 and 65,535, over ten orders of magnitude fewer unique cryptologically weak random number generators would be possible than would be if the parameters were selected as being any integer in the range 2-65,535. However, generating cryptologically weak random number generators with known long non-repeating cycles restricts the choice of parameters and increases the predictability of parameters. This increase in predictability should be minimized.

SUMMARY OF THE INVENTION

A method and apparatus are provided for generating parameters for a random number generator. A random value is generated and the random value is mapped to a prime number. Each of the parameters is generated by multiplying the prime number by previously selected prime numbers. The principles of the invention allow a large number of random number generators to be quickly re-keyed.

DETAILED DESCRIPTION

Figure 1:
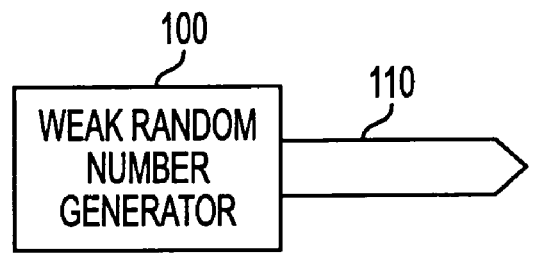
FIG. 1 illustrates a prior art cryptologically weak random number generator generating a stream of random numbers.
Figure 2:
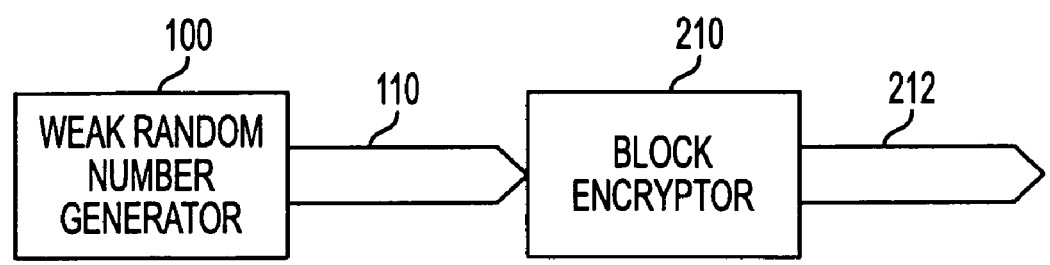
FIG. 2 illustrates the stream of random numbers generated by the cryptologically weak random number generator being encrypted by a block encryptor.
Figure 3A:
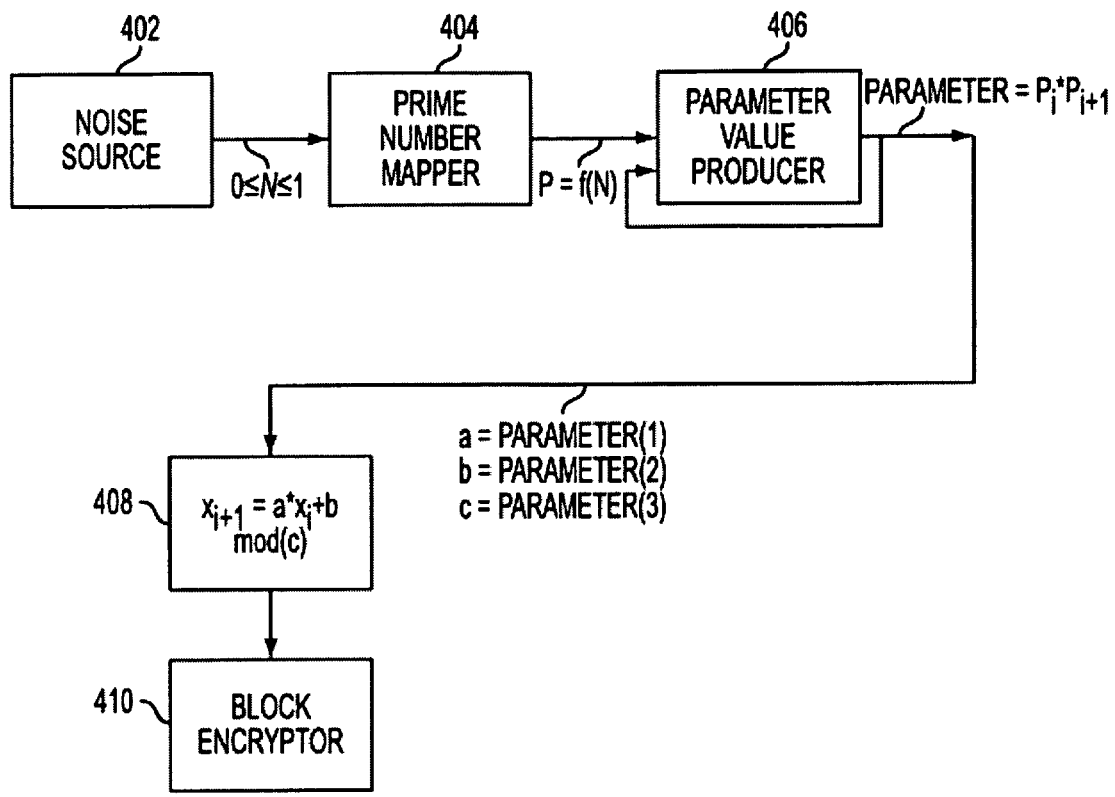
FIGS. 3A and 3B show a first embodiment of the invention.

FIG. 3A is a functional block diagram illustrating an embodiment of the invention. Noise source 402 may be, for example, a noise generator, such as a ST-NG1 noise generator manufactured by Radio Design Labs (RDL), to generate noise and thereby provide a random number in a range from 0 to 1, to prime number mapper 404. Prime number mapper 404 maps noise values to prime numbers, preferably using a nonlinear probability distribution as described in more detail herein. The prime numbers produced by prime number mapper 404 are used by parameter value producer 406 to produce a parameter value by multiplying a generated prime number by a previously-generated prime number to produce the parameter value. The produced parameter values are used by a random number generator, such as the LRNG, as parameters a, b and c. $X_{i+1}$, the output of the LRNG is then fed to the block encryptor 410 to be encrypted. Although this embodiment is shown as being used with the LRNG at 408, the invention is not limited to being used only with the LRNG, but may also be used with other random number generators. Moreover, the inventive principles can be practiced without using block encryptor 410.

Figure 3B:
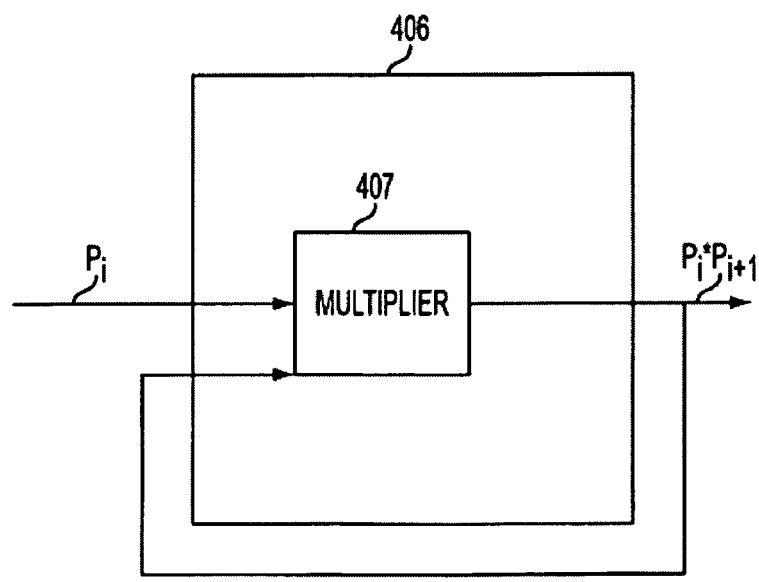

FIG. 3B provides a more detailed view of one embodiment of the parameter value producer 406. In this embodiment of the parameter value producer, the parameter value producer includes a multiplier 407 to multiply the prime factors derived from the prime number mapper to produce a parameter value.

Figure 3C:
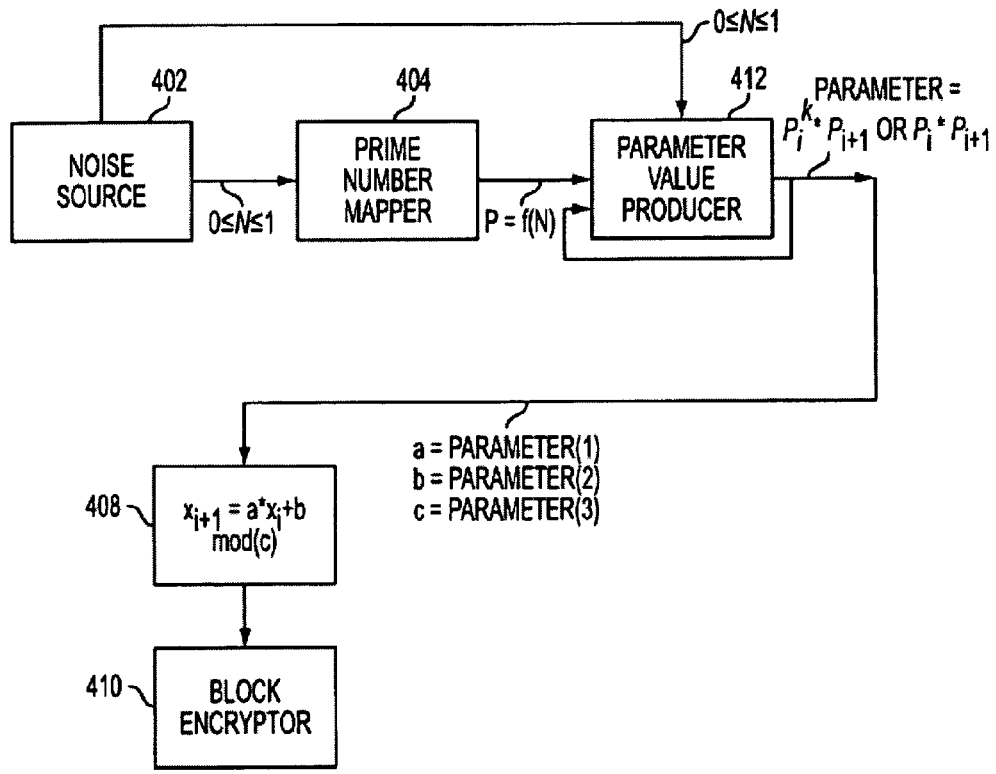
FIGS. 3C and 3D show a second embodiment of the invention.

FIG. 3C shows a system according to the invention with a second embodiment of a parameter value producer 412 which produces a parameter value by raising a prime number $P_i$ from the prime number mapper to a power, for example the $K^{th}$ power, to produce $P_i^K$ and multiplying the resultant value by another number $P_{i+1}$ generated by the prime number mapper.

Figure 3D:
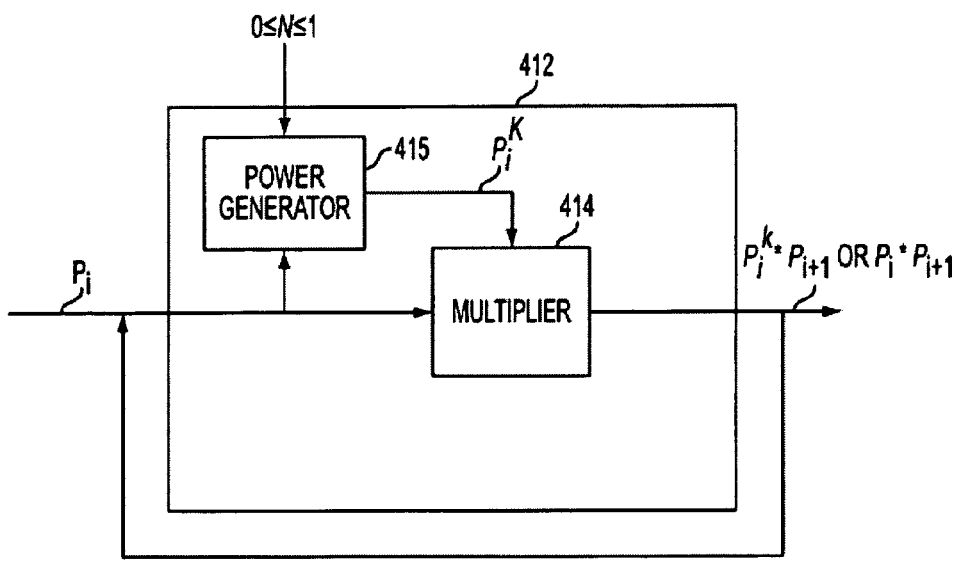

FIG. 3D provides a more detailed view of one embodiment of the parameter value producer 412. Multiplier 414 receives input from the prime number mapper and may receive input from power generator 415. The power generator receives a prime number $P_i$ from the prime number mapper and a random number N based on the noise source 402, such that $0 \leq N \leq 1$. The power generator then generates an exponent K, based on N, to be used with $P_i$ to produce $P_i^K$. $P_i^K$ is then fed into multiplier 414, which receives another prime number $P_{i+1}$, from the prime number mapper and produces $P_i^K * P_{i+1}$. This embodiment of the parameter value producer may also produce parameter values based on primes generated from the prime number mapper without using the power generator. That is, values such as $P_i * P_{i+1}$, as described in the embodiment of FIGS. 3A and 3B may be produced.

Figure 3E:
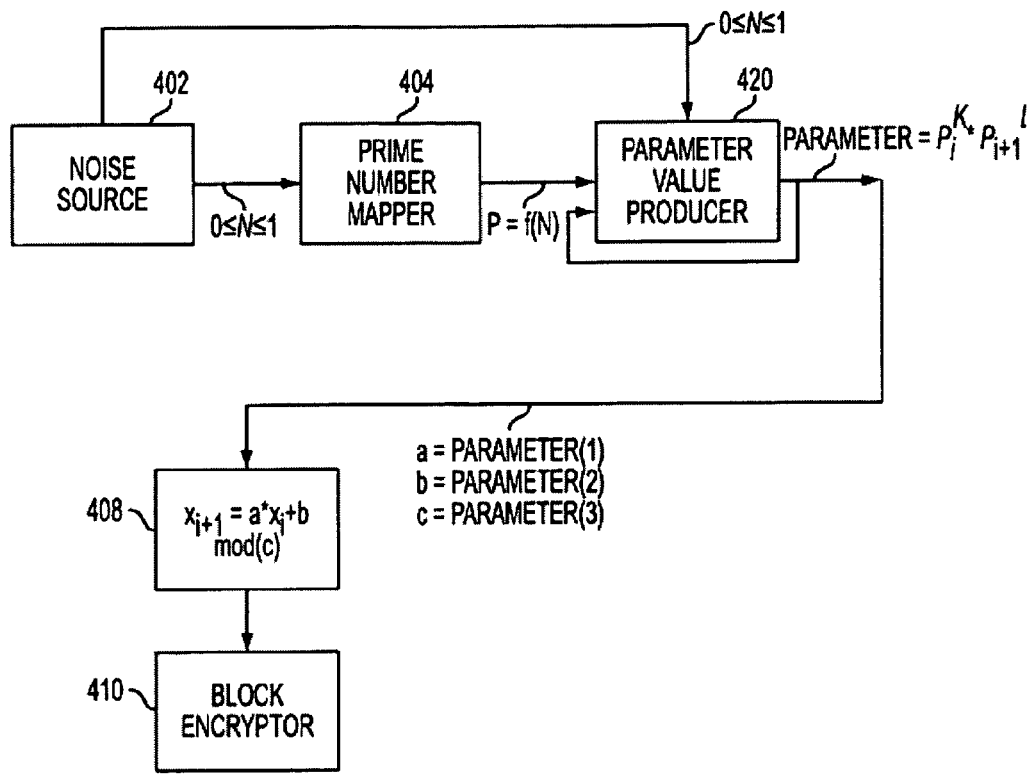
FIGS. 3E and 3F show a third embodiment of the invention.

FIG. 3E shows a system according to the invention with a third embodiment of a parameter value producer 420 which produces the parameter value by raising a prime number $P_i$ from the prime number mapper to a power, for example the $K^{th}$ power, $P_i^K$ and multiplying the resultant value by another number $P_{i+1}$ raised to the $L^{th}$ power.

Figure 3F:
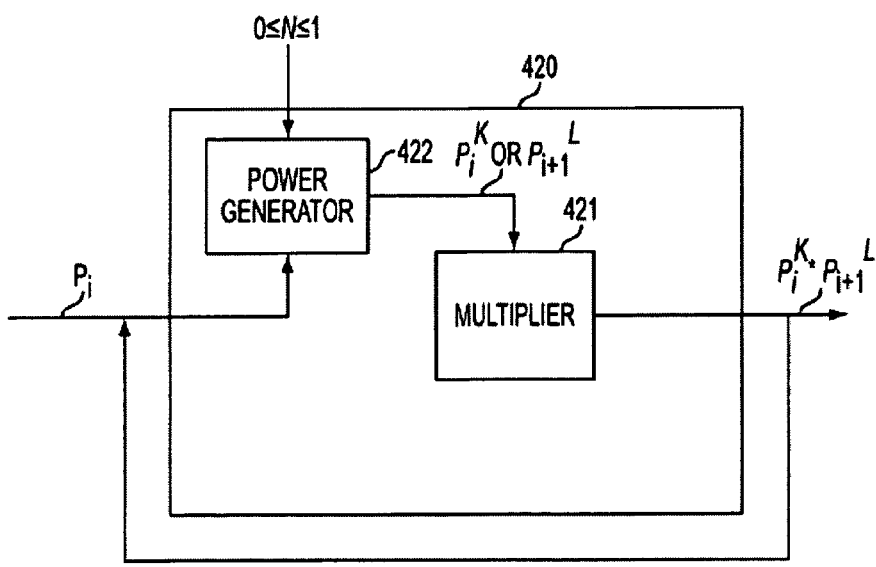

FIG. 3F provides a more detailed view of one embodiment of the parameter value producer 420. The power generator receives a prime number $P_i$ from the prime number mapper and a random number N based on the noise source 402, such that $0 \leq N \leq 1$. The power generator then generates an exponent K, based on N, to be used with $P_i$ to produce $P_i^K$. A next prime number $P_{i+1}$ arrives from the prime number mapper and is fed into the power generator. A second random number, based on the noise source, in a range from 0 to 1 arrives as input to the power generator, which generates an exponent L, based on the newly arrived random number and produces $(P_{i+1})^L$. Multiplier 421 multiplies $P_i^K * (P_{i+1})^L$ to produce a parameter value.

In one embodiment, the prime number mapper uses a table, such as shown in Table 1, that maps prime numbers to a nonlinearly assigned value. Each entry in Table 1 includes a prime number, followed by a cumulative weight. For example, the first entry in Table 1 is 2, a prime number, followed by the cumulative weight of selecting 2 as a prime factor. The table has entries for all prime numbers from 2 through 65,213 with their respective cumulative weights. The cumulative weights were derived empirically and were constructed to make the generated parameter values as unbiased as possible. Because the weights in the table are cumulative, larger prime numbers have larger cumulative weights than smaller prime numbers.

In a range of integers from 1 to N, where N is a maximum allowed number, about half of the integers have 2 as a prime factor, about ⅓ of the integers have 3 as a prime factor, about ⅕ of the integers have 5 as a prime factor and so on. The cumulative weights of Table 1 were derived by assigning cumulative weights to each of the prime numbers and generating at least 100,000 numbers from prime numbers using a noise generator to generate a random value, the prime number mapper to generate a prime number based on the random value, and multiplying the generated prime numbers to generate a product, such that the generated product was less than or equal to a maximum number. The prime factors of each of the generated numbers were then analyzed to determine whether they occurred substantially at the expected frequency, i.e. whether 2 was a prime factor of half of the numbers, whether 3 was a prime factor of ⅓ of the numbers and so on. If the expected occurrence frequency was not observed, the cumulative weights of the prime numbers were adjusted until the expected occurrence frequency was substantially observed.

Figure 4A:
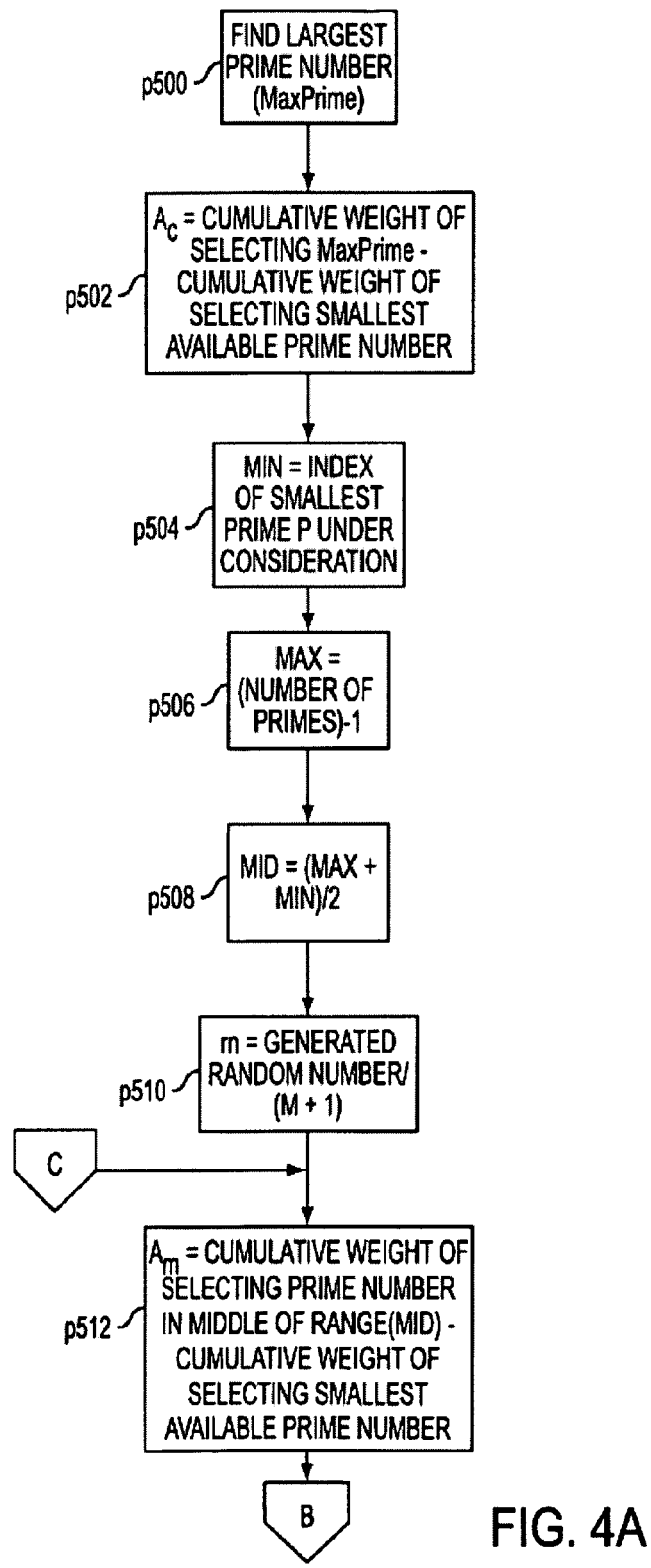
FIGS. 4A through 4B illustrate a flowchart for explaining processing in an embodiment of the prime number mapper.
Figure 4B:
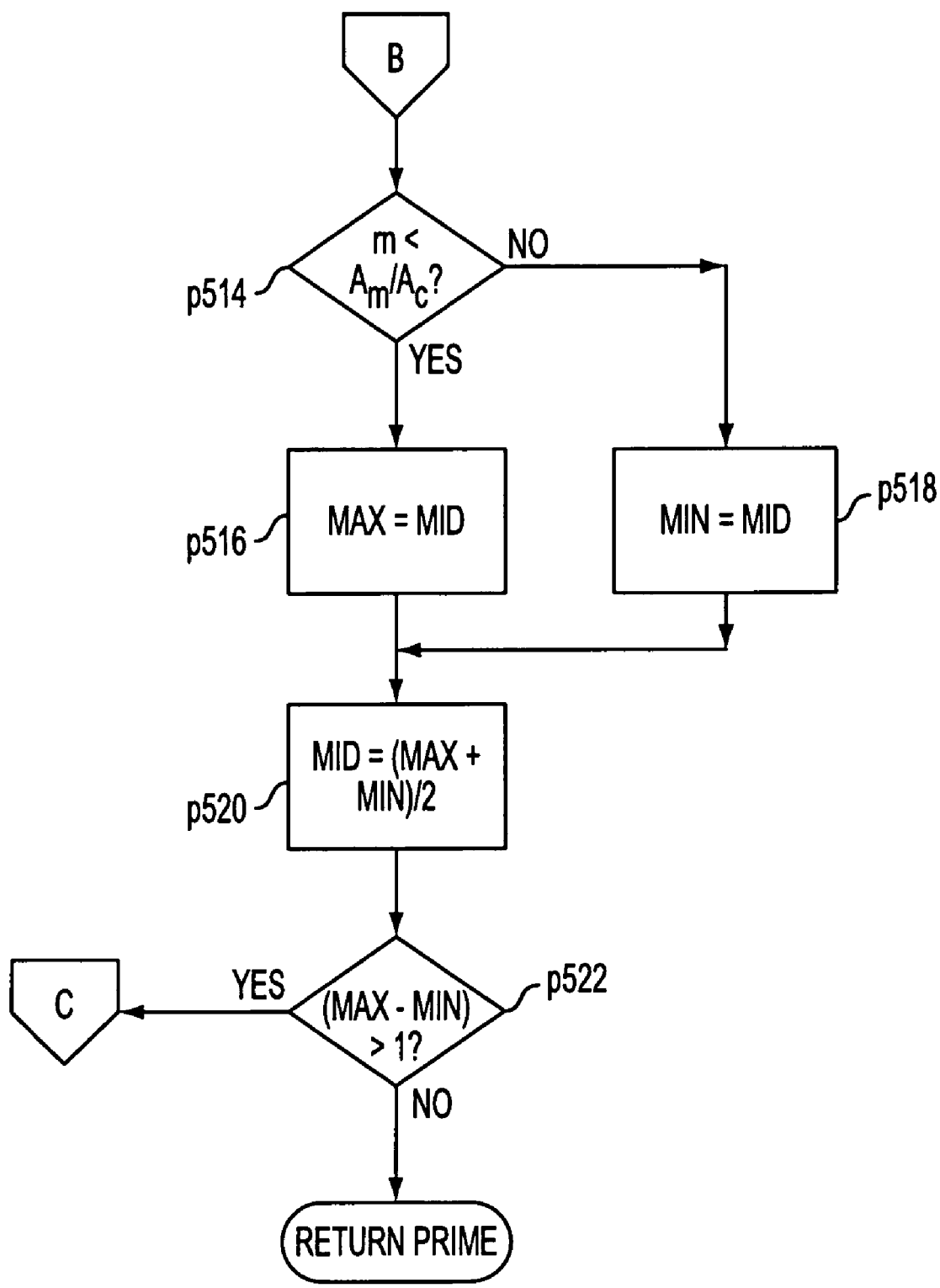

The processing in a software implementation of the prime number mapper 404 is shown in FIGS. 4A and 4B. The processing described in FIGS. 4A and 4B uses the table, as shown in Table 1, in which each entry includes a prime number and a cumulative weight.

In FIG. 4A, at p500, because a desired range of prime numbers may not include the range of prime numbers from 2 through 65,213, as defined in Table 1, i.e. the range may include a smaller set such as prime numbers less than 10,000, a largest prime number less than or equal to a maximum desired number is found from among the table of prime numbers. This can be accomplished using a number of techniques, such as analyzing each prime number entry starting from the end of the table until a prime number entry less than the maximum desired number is found. Another technique includes performing a binary search over the table of primes. The binary search is a well-known technique. The search could be performed by examining the prime number in the middle of the ordered prime number table and determining whether that number is less than the maximum desired number. If it is, then the prime value at a mid portion of a portion of the table between the examined prime number and the end of the table is examined. Otherwise, the prime value at the mid portion of the table between the beginning of the table and the currently examined number is examined. The remaining portions of the table are repeatedly divided in half and the mid values examined until the remaining portion of the table examined includes only one prime number, and that prime number is less than the maximum number.

At p502, the cumulative weight of selecting a prime number within a range of a smallest prime number, for example, 2, to the largest desired prime number is determined by subtracting the cumulative weight for the largest prime number in the desired range (derived from the table) from the cumulative weight of the smallest prime number (derived from the table). This value is stored in $A_c$.

P504 through p522 perform a modified binary search over the prime number/cumulative weight table, for example, the table of Table 1. A portion of the table searched depends on a comparison between a random number rn, which is in a range such that $0<rn\leq1$ and a ratio of a cumulative weight of an entry at a midpoint of a searched portion of the table and a cumulative weight of a maximum desired prime number. A size of a searched portion is repeatedly cut in half until no more than two entries remain in the searched portion.

At p504, min, an index to the smallest prime number entry in the prime number/cumulative weight table is set.

At p506, max, an index to the largest prime number entry in the prime number/cumulative weight table is set equal to the total number of primes in the prime number/cumulative weight table minus 1.

At p508, mid is set equal to (max+min) divided by 2. Thus, mid is an index to a midpoint entry within a range of entries of the prime number/cumulative weight table between an entry corresponding to the entry pointed to by min and an entry corresponding to the entry pointed to by max.

At p510, an integer random number in a range from 0 to a predetermined maximum integer M is generated. The random number may be generated based on noise from a noise source such as a noise generator. The random number is divided by (M+1), producing a number z, such that $0\leq z<1$. The number z is then stored in rn. Alternatively, the generated random number may not necessarily be an integer, but may be the number z, such that $0\leq z<1$, thus eliminating a need to divide the generated random number by (M+1).

At p512, the cumulative weight of a prime number in the middle of the range between max and min is determined by using the prime number/cumulative weight table to obtain the cumulative weight of the table entry indexed by mid and subtracting from this cumulative weight the cumulative weight of the smallest prime number in the prime/number cumulative weight table. This difference is then stored in $A_m$.

At p514, rn is compared with $A_m$ divided by $A_c$. If rn is less than $A_m$ divided by $A_c$, then p516 will be performed to set max equal to mid. Otherwise, p518 will be performed to set min equal to mid.

At p520, mid is set to (max+min) divided by 2, thus setting a new midpoint to a portion of the prime number/cumulative weight table.

At p522, (max−min) is compared with 1 and if greater than 1, p512 through p522 will again be performed, otherwise, the prime number from the prime number entry in the prime number/cumulative weight table pointed to by the min index is returned.

Figure 6:
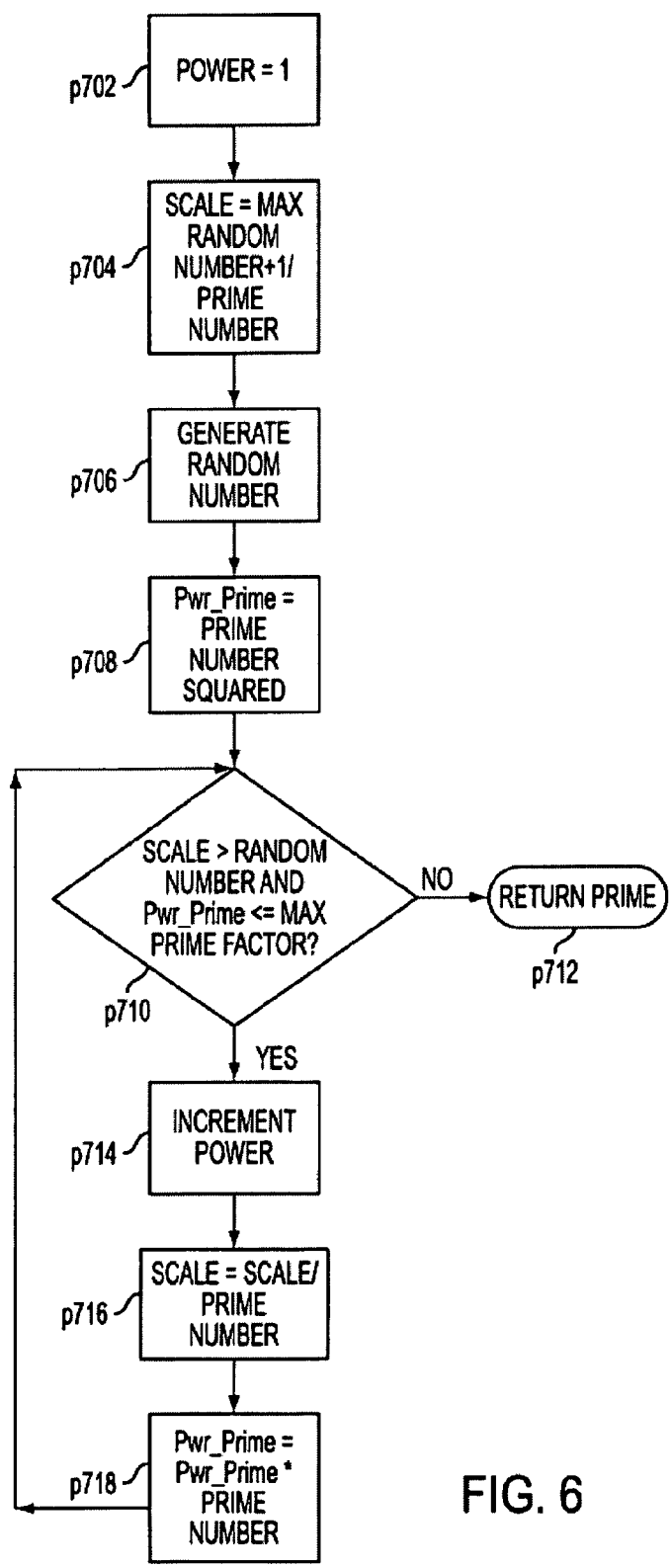
FIG. 6 is a flowchart which explains processing to calculate an exponent for a generated prime number.
Figure 7A:
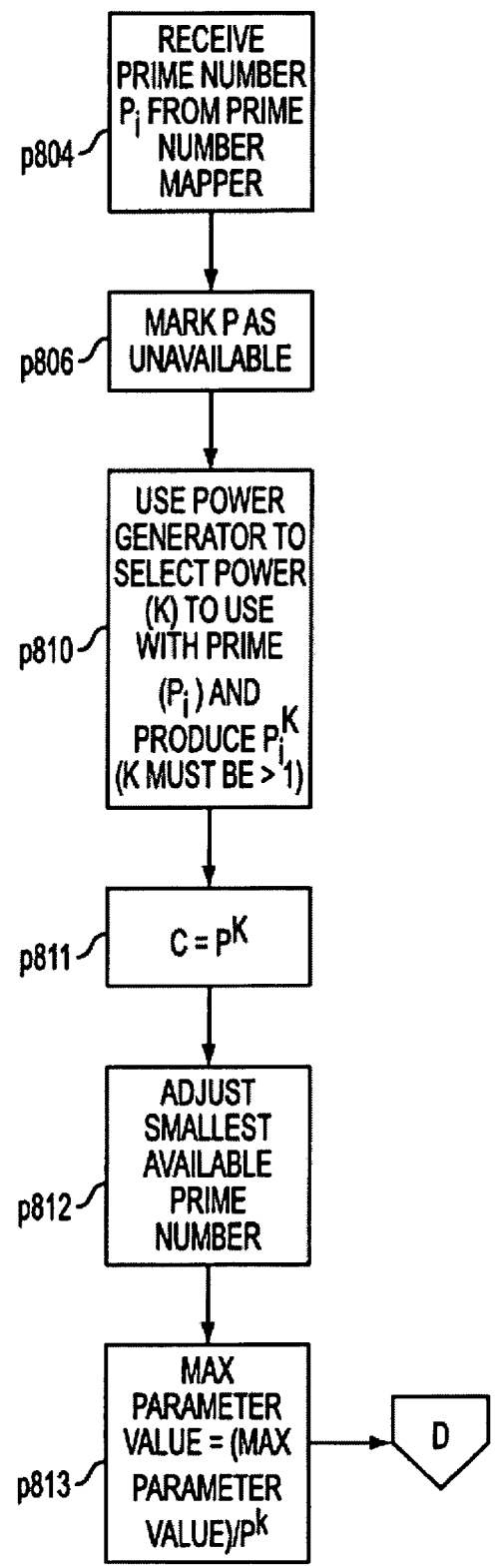
FIGS. 7A through 7E show a flowchart for explaining processing in an example of a parameter value producer to produce parameter values for parameters of a random number generator.
Figure 7B:
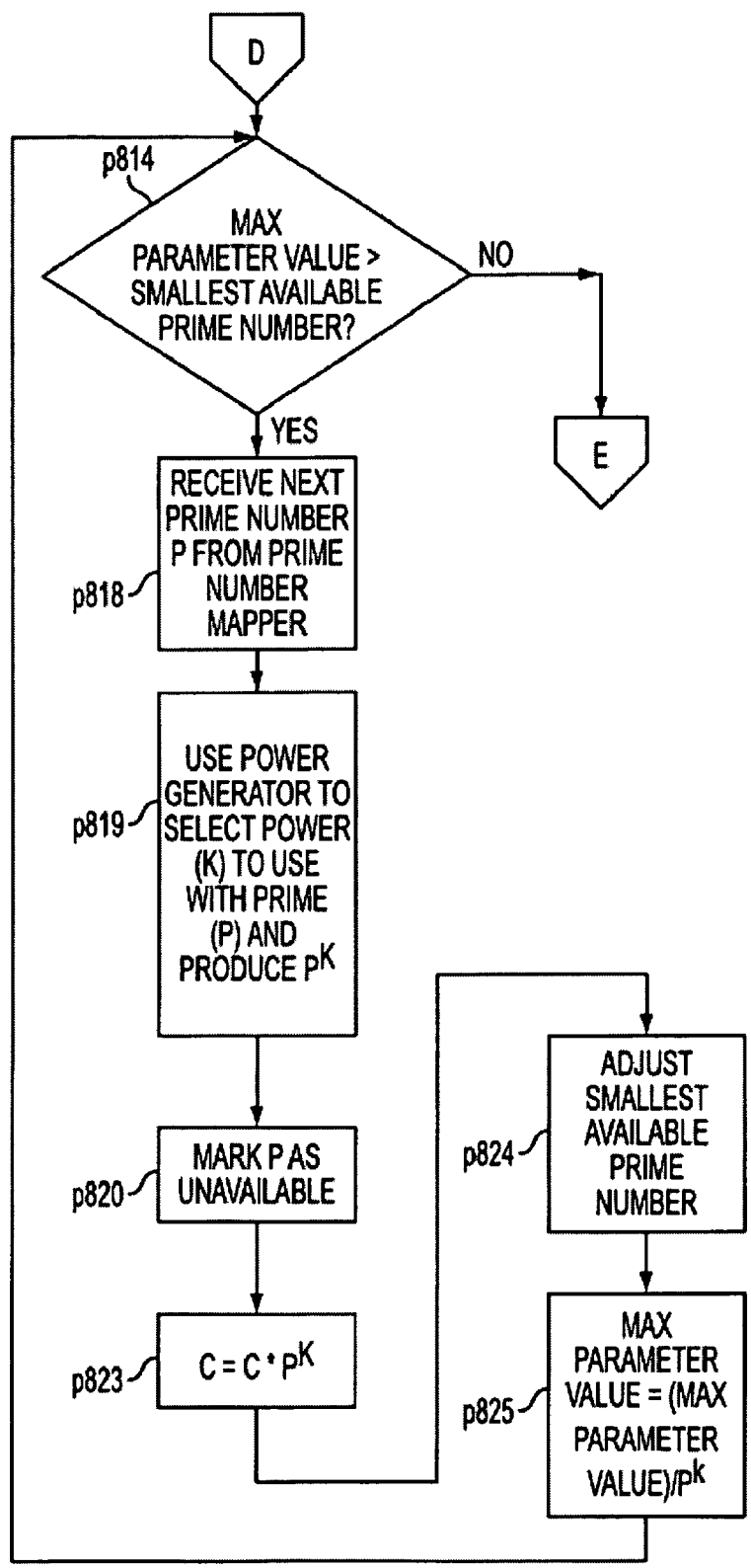
Figure 7C:
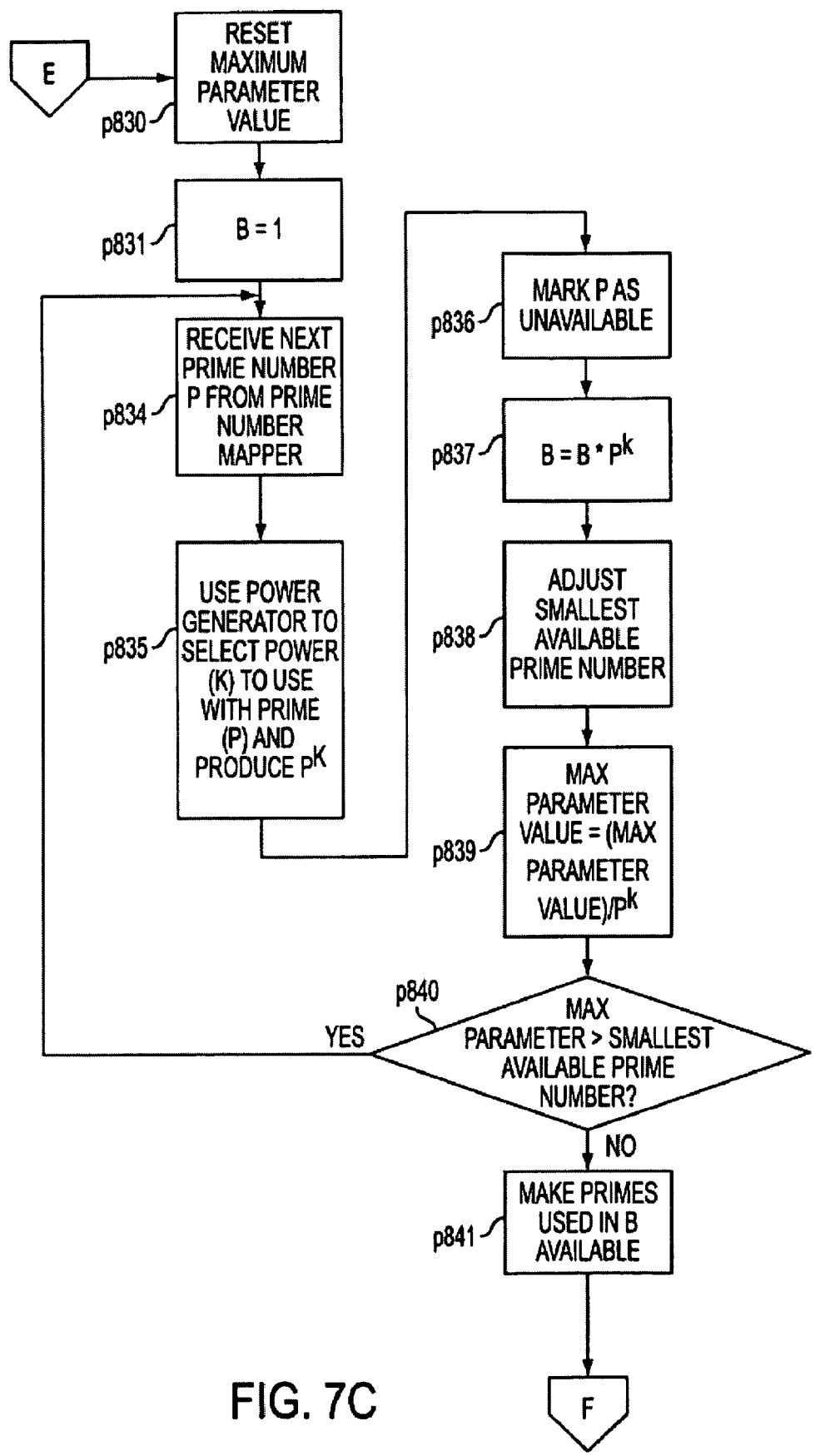
Figure 7D:
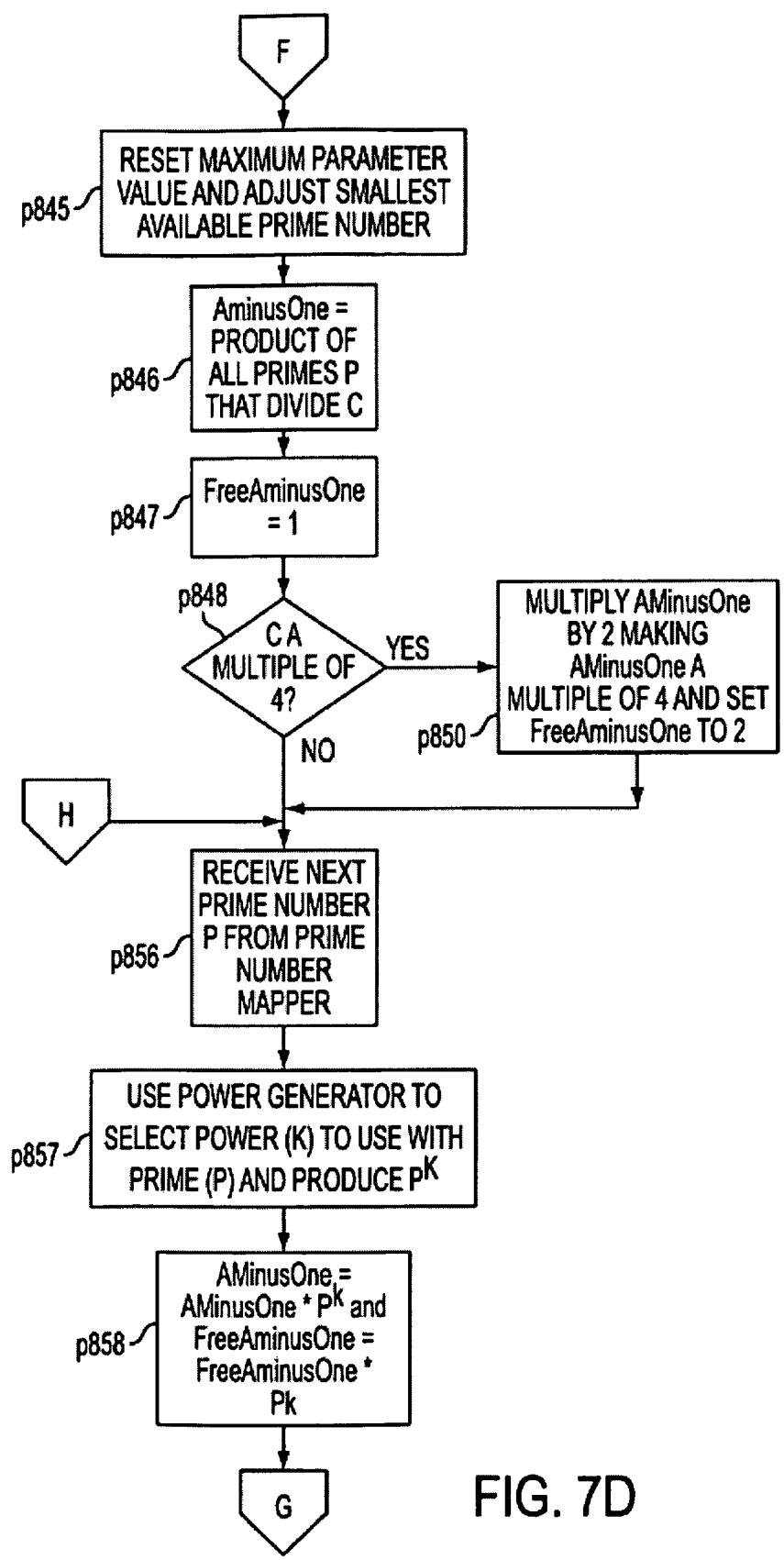
Figure 7E:
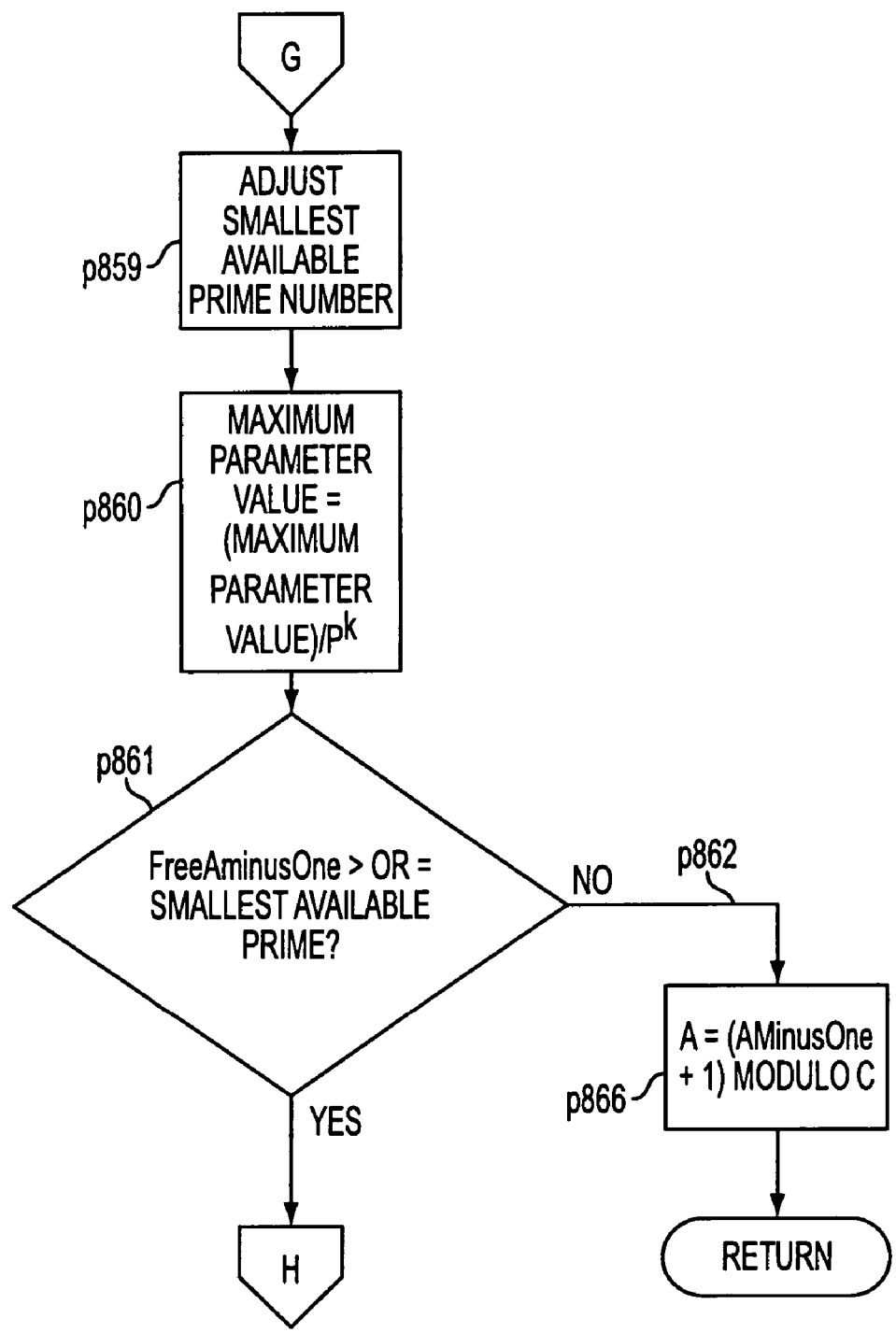

FIG. 6 explains the processing of a procedure which determines an exponent to be used with a generated prime number. This procedure may be used in an embodiment of the power generator 415 of FIGS. 3D and 422 of FIG. 3F.

At p702, Power is set to 1.

At p704, a maximum random value that can be generated is added to 1 and the resulting sum is divided by an already selected prime number, for example, $P_i$, and stored in Scale.

At p706, a random value between 0 and 1, based on a noise source is multiplied by a predetermined number to produce a random value in a range from 0 to the maximum random value.

At p708, Pwr_Prime is set equal to the previously selected prime number squared, for example $(P_i)^2$.

At p710, a check is made to determine whether Scale is greater than the generated random number, which is in the range from 0 to the maximum random value, and whether Pwr_Prime is less than or equal to a previously determined maximum prime factor. If not, at p712 the value of power is returned. Otherwise, at p714 power is incremented by 1.

At p716, the value of Scale is reduced by dividing Scale by the previously selected prime number, for example, $P_i$.

At p718, Pwr_Prime is multiplied by the prime number, $P_i$.

P710 through p718 will continue to be performed until the check at p710 determines that Scale is not greater than the generated random value or Pwr_Prime is greater than the maximum prime factor causing p712 to return a current value of Power.

Figure 5:
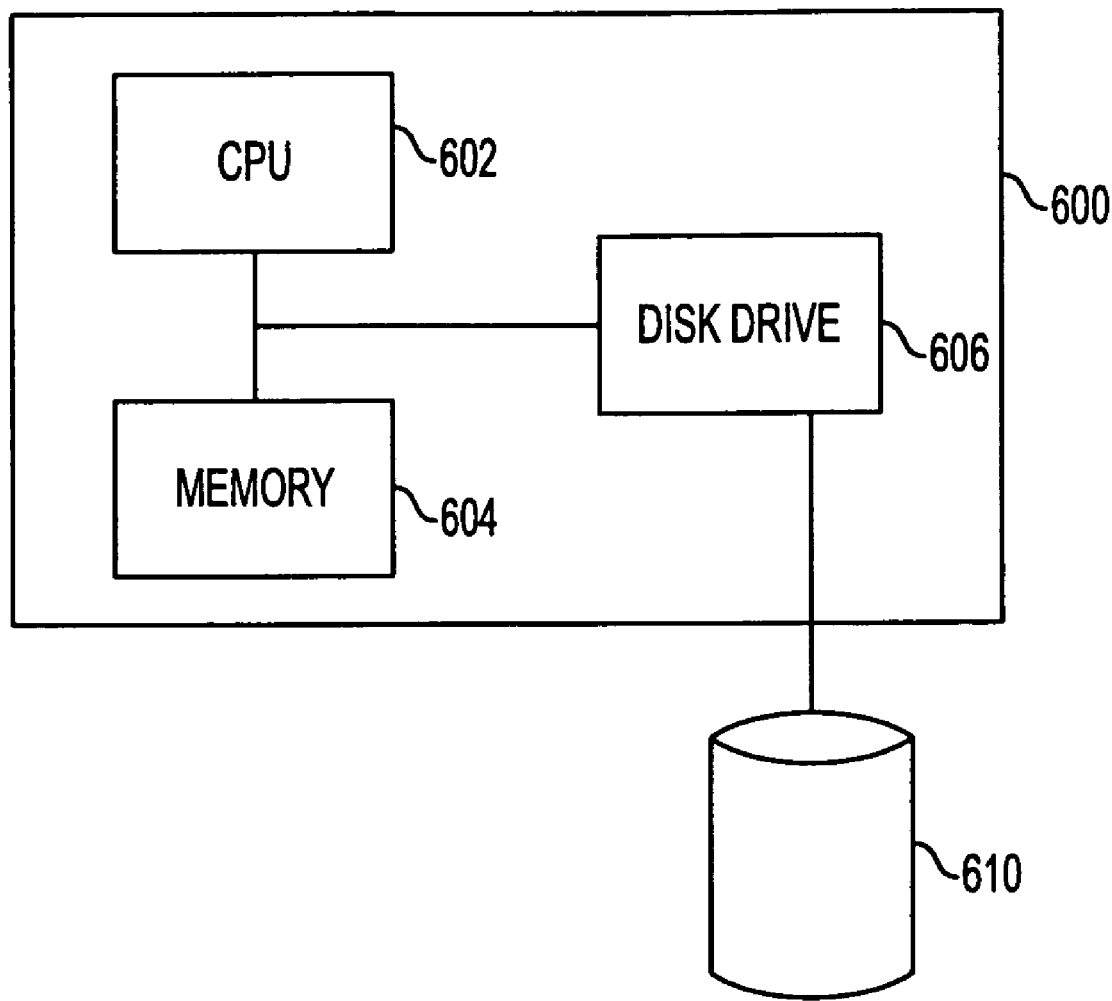
FIG. 5 shows an example of an apparatus for a random number generator.

FIG. 5 illustrates an example of an apparatus for a random number generator 600. The apparatus includes a CPU 602 and storage, such as a memory 604. The apparatus may also include a disk drive 606 which may be a hard drive or a floppy drive or an optical storage medium. A disk 610, which would reside in disk drive 606 may include data and instructions for the CPU 602 to map random values to prime numbers and produce parameter values for a random number generator.

FIGS. 7A through 7E illustrate a flowchart which describes the processing in an embodiment of the parameter value producer 412, shown in FIGS. 3E and 3F for generating parameter values which conform to the desirable properties for parameter values previously described for parameters a, b and c of a LRNG random number generator. Note that A, B and C in the flowchart correspond to a, b and c parameters of a LRNG.

At p804, request and receive from the prime number mapper a prime number P, such that the prime number P is less than the square root of the maximum parameter value.

At p806, the received prime number P is stored in a table in order to keep track of prime factors that are now unavailable. These numbers will not be produced by the prime number mapper.

At p810, the power generator determines a power K using, for example, the procedure described in FIG. 6. If a value of 1 is returned for K, it will be set to 2.

At p811, C is set to be the prime number P raised to the K power, thus satisfying rule 4 of desirable properties for LRNG's.

At p812, the smallest available prime is adjusted taking the just selected prime P into account.

At p813, the maximum parameter value is scaled down by dividing it by $P_k$.

At p814, a check is made to determine whether the maximum parameter value is greater than the smallest available prime number. If it is not, then processing proceeds to p830. Otherwise processing proceeds to p818. Note that as primes are generated to build the parameter, they may not be reused. Thus, if 2 were selected, then 2 may no longer be the smallest available prime number. The Maximum Parameter Value is a predetermined value which may depend on a word size of the computer. For example, if the word size is 32 bits, then a Maximum Parameter Value of 65,536 may be desired.

At p818, using the procedure described in FIG. 4A and FIG. 4B, a prime number P is received from the prime number mapper.

At p819, the power generator determines a power K and produces $P^K$.

At p820, the prime number P is made unavailable to the prime number value mapper.

At p823, C is updated to be equal to itself multiplied by the last selected prime number P raised to the K power.

At p824, the smallest available prime number is adjusted.

At p825, the maximum parameter value is scaled down by dividing it by $P^k$.

P814-p825 repeat until the check at p814 determines that the maximum parameter value is greater than the smallest available prime number. If this determination is made, then processing proceeds to p830.

At p830, the maximum parameter value is reset to the maximum desired parameter value.

At p831, parameter B is set to 1.

At p834, a next prime value P is received from the prime number mapper. Since, according to rule 1 of the desirable properties for LRNG's, B is relatively prime to C, the received prime number P is not selected from the unavailable prime numbers which were used to generate C.

At p835, the power generator determines a power K and produces $P^K$.

At p836, the prime number P is marked as unavailable.

At p837, the parameter B is multiplied by the last selected prime factor P raised to the K power to produce an updated value of B.

At p838, the smallest available prime number is adjusted.

At p839, the maximum parameter value is scaled down by dividing it by $P^k$.

At p840, a check is made to determine whether the maximum parameter value is greater than the smallest available prime number. If it is not, then processing proceeds to p841. Otherwise processing proceeds to p834.

At p841, All primes used in B are made available.

At p845, the maximum parameter value is reset to the maximum desired parameter value and the smallest available prime number is adjusted.

In order to satisfy rule 2 for LRNG's, at p846, AMinusOne is set equal to the product of all primes P that divide C by setting AMinusOne to the product of all prime factors stored in the table used to keep track of the prime factors of C.

At p847, FreeAminusOne is set to 1.

In order to satisfy rule 3 for LRNG's, at p848, a check will be made to determine whether C is a multiple of 4, and if so, p850 will be performed to multiply AMinusOne by 2, thereby making AMinusOne a multiple of 4 also. In addition, FreeAminusOne will set to 2.

At p856, a next prime P is received from the prime number mapper.

At p857, the power generator determines a power K and produces $P^K$.

At p858, AMinusOne is updated to be equal to a product of AMinusOne and $P^k$ and FreeAminusOne is updated to be equal to a product of FreeAMinusOne and $P^k$.

At p859, the smallest available prime number is adjusted and at p860, the maximum parameter value is scaled by dividing it by $P^K$.

At p861, a check is made to determine whether FreeAMinusOne is greater than or equal to the smallest available prime number, and if not, A is set to (AMinusOne+1) % C. Otherwise, the process returns to p856.

Thus, if FreeAMinusOne is greater than or equal to the smallest available prime number then AMinusOne continues to be multiplied by prime numbers.

By performing a procedure such as described in FIGS. 7A-7E, one could easily see that the parameters a, b and c for the linear congruential (LRNG) random number generator conform to the four (4) rules described previously.

FIGS. 7A through 7E show an implementation for use with a LRNG random number generator; however, other generators may be used as well.

Figure 8:
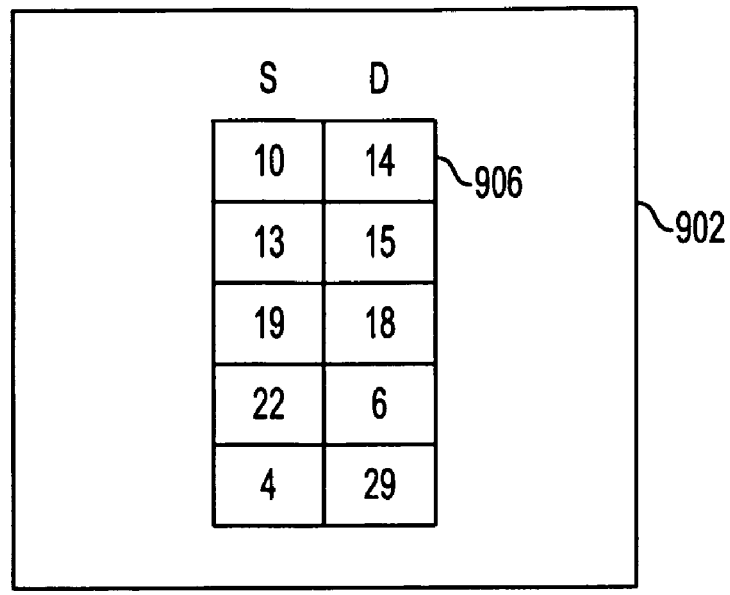
FIG. 8 illustrates a use for the random number generator in which one of a number of network addresses may be used.
Figure 8:
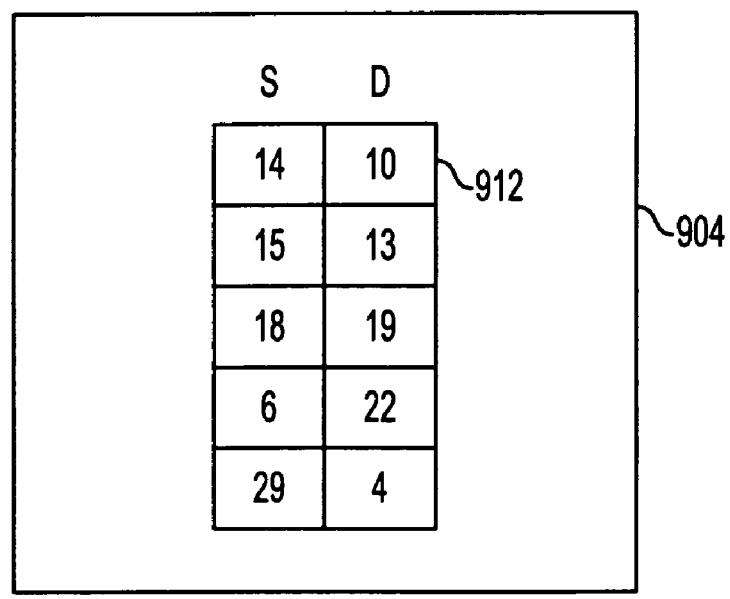

An embodiment of the invention may be used to generate quasi-random numbers for at least a portion of the network addresses for use in transmitting data packets in a communication network. For example, FIG. 8 illustrates two network nodes, 902 and 904, which are in communication with each other. For simplicity, the tables 906 and 912 only refer to addresses used for communication between these two nodes only. Further, for simplicity, this example shows entire addresses being generated from quasi-random numbers; however, partial addresses, partial headers and parts of other fields may be generated from quasi-random numbers. For example, table 906 in network node 902 illustrates a list of source addresses, in the S column and a list of destination addresses in the D column. This table corresponds to table 912 in network node 904 which contains information corresponding to table 906. For example, the source information of table 906 is reflected as the destination information of table 912 and vice versa. The tables generally would be much larger than shown, for example one hundred or one thousand addresses or more. Each pair of addresses (e.g., a source and a destination address) can be used once to transmit a single message, such that each message appears to contain a randomly-generated pair of network addresses.

An embodiment of the invention would be used to generate quasi-random tables for both node 902 and node 904 so that both nodes can keep track of the addresses to be used. For example, consecutive data packets sent from node 902 to node 904 may have the following source/destination addresses, respectively, 10/14; 13/15; 19/18; 22/6; 4/29. Thus, to an observer, such as a hacker, the addresses would appear to hop from one address to another in a seemingly random fashion although communications are taking place between node 902 and node 904.

The above embodiment may be implemented by using, for example, a LRNG random number generator and the embodiment as shown in FIGS. 3C and 3D to generate parameter values for parameters a, b and c. $x_{i+1}$ the output of the LRNG may then be fed through the block encryptor 410. The resultant values of $x_{i+1}$ could be used as network addresses or parts of network addresses in the tables.

Embodiments of the invention may be implemented in hardware, software, or firmware. The firmware may be in a read-only memory and the software may reside on a medium such as a floppy disk, optical, disk, or CDROM, for example.

While the invention has been described with reference to certain illustrated embodiments, the words which have been used herein are words of description, rather than words of limitation. Changes may be within the purview of the appended claims without departing from the scope and spirit of the invention in its aspects. Although the invention has been described herein with reference to particular structures, acts, and materials, the invention is not to be limited to the particulars disclosed but rather extends to all equivalent structures, acts, and materials, such as are within the scope of the appended claims.

TABLE 1

(2,32461)(3,38330)(5,39806)(7,40588)(11,41102)
(13,41554)(17,41918)(19,42258)(23,42557)(29,42811)
(31,43057)(37,43272)(41,43474)(43,43675)(47,43867)
(53,44046)(59,44215)(61,44387)(67,44552)(71,44717)
(73,44886)(79,45043)(83,45193)(89,45334)(97,45463)
(101,45588)(103,45710)(107,45828)(109,45945)(113,46057)
(127,46158)(131,46256)(137,46351)(139,46444)(149,46531)
(151,46618)(157,46702)(163,46782)(167,46862)(173,46938)
(179,47013)(181,47087)(191,47157)(193,47227)(197,47296)
(199,47364)(211,47429)(223,47491)(227,47552)(229,47613)
(233,47672)(239,47731)(241,47789)(251,47846)(257,47901)
(263,47955)(269,48008)(271,48062)(277,48114)(281,48165)
(283,48217)(293,48267)(307,48315)(311,48363)(313,48410)
(317,48457)(331,48503)(337,48547)(347,48590)(349,48633)
(353,48675)(359,48717)(367,48758)(373,48798)(379,48838)
(383,48877)(389,48916)(397,48954)(401,48991)(409,49028)
(419,49064)(421,49100)(431,49135)(433,49170)(439,49205)
(443,49239)(449,49273)(457,49306)(461,49339)(463,49372)
(467,49404)(479,49436)(487,49467)(491,49498)(499,49529)
(503,49559)(509,49589)(521,49619)(523,49648)(541,49676)
(547,49705)(557,49732)(563,49760)(569,49787)(571,49814)
(577,49840)(587,49867)(593,49893)(599,49919)(601,49944)
(607,49970)(613,49995)(617,50020)(619,50045)(631,50070)
(641,50094)(643,50119)(647,50143)(653,50167)(659,50190)
(661,50214)(673,50237)(677,50260)(683,50283)(691,50306)
(701,50328)(709,50350)(719,50372)(727,50394)(733,50415)
(739,50437)(743,50458)(751,50479)(757,50500)(761,50521)
(769,50541)(773,50562)(787,50582)(797,50602)(809,50622)
(811,50641)(821,50661)(823,50680)(827,50700)(829,50719)
(839,50738)(853,50757)(857,50776)(859,50794)(863,50813)
(877,50831)(881,50850)(883,50868)(887,50886)(907,50904)
(911,50922)(919,50939)(929,50957)(937,50974)(941,50991)
(947,51008)(953,51025)(967,51042)(971,51059)(977,51076)
(983,51092)(991,51109)(997,51125)(1009,51142)(1013,51158)
(1019,51174)(1021,51190)(1031,51206)(1033,51222)(1039,51238)
(1049,51254)(1051,51269)(1061,51285)(1063,51300)(1069,51316)
(1087,51331)(1091,51346)(1093,51362)(1097,51377)(1103,51392)
(1109,51407)(1117,51422)(1123,51437)(1129,51451)(1151,51466)
(1153,51481)(1163,51495)(1171,51509)(1181,51524)(1187,51538)
(1193,51552)(1201,51566)(1213,51580)(1217,51594)(1223,51608)
(1229,51622)(1231,51635)(1237,51649)(1249,51663)(1259,51676)
(1277,51690)(1279,51703)(1283,51716)(1289,51730)(1291,51743)
(1297,51756)(1301,51769)(1303,51782)(1307,51795)(1319,51809)
(1321,51822)(1327,51835)(1361,51847)(1367,51860)(1373,51873)
(1381,51885)(1399,51898)(1409,51910)(1423,51922)(1427,51934)
(1429,51947)(1433,51959)(1439,51971)(1447,51983)(1451,51995)
(1453,52007)(1459,52019)(1471,52031)(1481,52043)(1483,52055)

TABLE 1-continued (1487,52067)(1489,52079)(1493,52091)(1499,52103)(1511,52114)
(1523,52126)(1531,52138)(1543,52149)(1549,52161)(1553,52172)
(1559,52183)(1567,52195)(1571,52206)(1579,52218)(1583,52229)
(1597,52240)(1601,52251)(1607,52263)(1609,52274)(1613,52285)
(1619,52296)(1621,52307)(1627,52318)(1637,52329)(1657,52340)
(1663,52351)(1667,52362)(1669,52373)(1693,52384)(1697,52395)
(1699,52405)(1709,52416)(1721,52427)(1723,52437)(1733,52448)
(1741,52458)(1747,52469)(1753,52480)(1759,52490)(1777,52500)
(1783,52511)(1787,52521)(1789,52532)(1801,52542)(1811,52552)
(1823,52562)(1831,52573)(1847,52583)(1861,52593)(1867,52603)
(1871,52613)(1873,52623)(1877,52633)(1879,52643)(1889,52653)
(1901,52663)(1907,52673)(1913,52683)(1931,52692)(1933,52702)
(1949,52712)(1951,52722)(1973,52732)(1979,52741)(1987,52751)
(1993,52760)(1997,52770)(1999,52780)(2003,52789)(2011,52799)
(2017,52808)(2027,52818)(2029,52827)(2039,52837)(2053,52846)
(2063,52856)(2069,52865)(2081,52875)(2083,52884)(2087,52893)
(2089,52903)(2099,52912)(2111,52921)(2113,52930)(2129,52940)
(2131,52949)(2137,52958)(2141,52967)(2143,52976)(2153,52986)
(2161,52995)(2179,53004)(2203,53013)(2207,53022)(2213,53031)
(2221,53040)(2237,53049)(2239,53058)(2243,53066)(2251,53075)
(2267,53084)(2269,53093)(2273,53102)(2281,53110)(2287,53119)
(2293,53128)(2297,53136)(2309,53145)(2311,53154)(2333,53162)
(2339,53171)(2341,53179)(2347,53188)(2351,53196)(2357,53205)
(2371,53213)(2377,53222)(2381,53230)(2383,53238)(2389,53247)
(2393,53255)(2399,53263)(2411,53272)(2417,53280)(2423,53288)
(2437,53296)(2441,53305)(2447,53313)(2459,53321)(2467,53329)
(2473,53337)(2477,53345)(2503,53353)(2521,53361)(2531,53369)
(2539,53377)(2543,53385)(2549,53393)(2551,53401)(2557,53409)
(2579,53417)(2591,53424)(2593,53432)(2609,53440)(2617,53448)
(2621,53455)(2633,53463)(2647,53471)(2657,53478)(2659,53486)
(2663,53493)(2671,53501)(2677,53508)(2683,53516)(2687,53524)
(2689,53531)(2693,53539)(2699,53546)(2707,53554)(2711,53561)
(2713,53568)(2719,53576)(2729,53583)(2731,53591)(2741,53598)
(2749,53606)(2753,53613)(2767,53620)(2777,53628)(2789,53635)
(2791,53642)(2797,53649)(2801,53657)(2803,53664)(2819,53671)
(2833,53678)(2837,53685)(2843,53693)(2851,53700)(2857,53707)
(2861,53714)(2879,53721)(2887,53728)(2897,53735)(2903,53742)
(2909,53749)(2917,53756)(2927,53763)(2939,53770)(2953,53777)
(2957,53784)(2963,53791)(2969,53798)(2971,53805)(2999,53811)
(3001,53818)(3011,53825)(3019,53832)(3023,53839)(3037,53845)
(3041,53852)(3049,53859)(3061,53866)(3067,53872)(3079,53879)
(3083,53886)(3089,53892)(3109,53899)(3119,53905)(3121,53912)
(3137,53919)(3163,53925)(3167,53932)(3169,53938)(3181,53945)
(3187,53951)(3191,53958)(3203,53964)(3209,53970)(3217,53977)
(3221,53983)(3229,53990)(3251,53996)(3253,54002)(3257,54009)
(3259,54015)(3271,54021)(3299,54028)(3301,54034)(3307,54040)
(3313,54046)(3319,54053)(3323,54059)(3329,54065)(3331,54071)
(3343,54078)(3347,54084)(3359,54090)(3361,54096)(3371,54102)
(3373,54109)(3389,54115)(3391,54121)(3407,54127)(3413,54133)
(3433,54139)(3449,54145)(3457,54151)(3461,54157)(3463,54163)
(3467,54169)(3469,54175)(3491,54181)(3499,54187)(3511,54193)
(3517,54199)(3527,54205)(3529,54211)(3533,54217)(3539,54223)
(3541,54229)(3547,54235)(3557,54240)(3559,54246)(3571,54252)
(3581,54258)(3583,54264)(3593,54270)(3607,54276)(3613,54281)
(3617,54287)(3623,54293)(3631,54299)(3637,54304)(3643,54310)
(3659,54316)(3671,54322)(3673,54327)(3677,54333)(3691,54339)
(3697,54345)(3701,54350)(3709,54356)(3719,54362)(3727,54367)
(3733,54373)(3739,54379)(3761,54384)(3767,54390)(3769,54395)
(3779,54401)(3793,54407)(3797,54412)(3803,54418)(3821,54423)
(3823,54429)(3833,54434)(3847,54440)(3851,54445)(3853,54451)
(3863,54456)(3877,54462)(3881,54467)(3889,54473)(3907,54478)
(3911,54484)(3917,54489)(3919,54494)(3923,54500)(3929,54505)
(3931,54511)(3943,54516)(3947,54521)(3967,54527)(3989,54532)
(4001,54537)(4003,54543)(4007,54548)(4013,54553)(4019,54559)
(4021,54564)(4027,54569)(4049,54575)(4051,54580)(4057,54585)
(4073,54590)(4079,54596)(4091,54601)(4093,54606)(4099,54611)
(4111,54616)(4127,54622)(4129,54627)(4133,54632)(4139,54637)
(4153,54642)(4157,54648)(4159,54653)(4177,54658)(4201,54663)
(4211,54668)(4217,54673)(4219,54678)(4229,54683)(4231,54688)
(4241,54693)(4243,54699)(4253,54704)(4259,54709)(4261,54714)
(4271,54719)(4273,54724)(4283,54729)(4289,54734)(4297,54739)
(4327,54744)(4337,54749)(4339,54754)(4349,54759)(4357,54764)
(4363,54769)(4373,54774)(4391,54779)(4397,54784)(4409,54788)
(4421,54793)(4423,54798)(4441,54803)(4447,54808)(4451,54813)
(4457,54818)(4463,54823)(4481,54828)(4483,54832)(4493,54837)
(4507,54842)(4513,54847)(4517,54852)(4519,54857)(4523,54861)
(4547,54866)(4549,54871)(4561,54876)(4567,54881)(4583,54885)
(4591,54890)(4597,54895)(4603,54900)(4621,54904)(4637,54909)
(4639,54914)(4643,54918)(4649,54923)(4651,54928)(4657,54933)

TABLE 1-continued (4663,54937)(4673,54942)(4679,54947)(4691,54951)(4703,54956)
(4721,54961)(4723,54965)(4729,54970)(4733,54975)(4751,54979)
(4759,54984)(4783,54988)(4787,54993)(4789,54998)(4793,55002)
(4799,55007)(4801,55011)(4813,55016)(4817,55021)(4831,55025)
(4861,55030)(4871,55034)(4877,55039)(4889,55043)(4903,55048)
(4909,55052)(4919,55057)(4931,55061)(4933,55066)(4937,55070)
(4943,55075)(4951,55079)(4957,55084)(4967,55088)(4969,55093)
(4973,55097)(4987,55102)(4993,55106)(4999,55110)(5003,55115)
(5009,55119)(5011,55124)(5021,55128)(5023,55133)(5039,55137)
(5051,55141)(5059,55146)(5077,55150)(5081,55155)(5087,55159)
(5099,55163)(5101,55168)(5107,55172)(5113,55176)(5119,55181)
(5147,55185)(5153,55190)(5167,55194)(5171,55198)(5179,55203)
(5189,55207)(5197,55211)(5209,55215)(5227,55220)(5231,55224)
(5233,55228)(5237,55233)(5261,55237)(5273,55241)(5279,55245)
(5281,55250)(5297,55254)(5303,55258)(5309,55262)(5323,55267)
(5333,55271)(5347,55275)(5351,55279)(5381,55284)(5387,55288)
(5393,55292)(5399,55296)(5407,55300)(5413,55304)(5417,55309)
(5419,55313)(5431,55317)(5437,55321)(5441,55325)(5443,55329)
(5449,55334)(5471,55338)(5477,55342)(5479,55346)(5483,55350)
(5501,55354)(5503,55358)(5507,55363)(5519,55367)(5521,55371)
(5527,55375)(5531,55379)(5557,55383)(5563,55387)(5569,55391)
(5573,55395)(5581,55399)(5591,55404)(5623,55408)(5639,55412)
(5641,55416)(5647,55420)(5651,55424)(5653,55428)(5657,55432)
(5659,55436)(5669,55440)(5683,55444)(5689,55448)(5693,55452)
(5701,55456)(5711,55460)(5717,55464)(5737,55468)(5741,55472)
(5743,55476)(5749,55480)(5779,55484)(5783,55488)(5791,55492)
(5801,55496)(5807,55500)(5813,55504)(5821,55508)(5827,55512)
(5839,55516)(5843,55520)(5849,55524)(5851,55528)(5857,55532)
(5861,55535)(5867,55539)(5869,55543)(5879,55547)(5887,55551)
(5897,55555)(5903,55559)(5923,55563)(5927,55567)(5939,55571)
(5953,55575)(5981,55578)(5987,55582)(6007,55586)(6011,55590)
(6029,55594)(6037,55598)(6043,55602)(6047,55606)(6053,55609)
(6067,55613)(6073,55617)(6079,55621)(6089,55625)(6091,55629)
(6101,55632)(6113,55636)(6121,55640)(6131,55644)(6133,55648)
(6143,55651)(6151,55655)(6163,55659)(6173,55663)(6197,55667)
(6199,55670)(6203,55674)(6211,55678)(6217,55682)(6221,55685)
(6229,55689)(6247,55693)(6257,55697)(6263,55700)(6269,55704)
(6271,55708)(6277,55712)(6287,55715)(6299,55719)(6301,55723)
(6311,55727)(6317,55730)(6323,55734)(6329,55738)(6337,55742)
(6343,55745)(6353,55749)(6359,55753)(6361,55756)(6367,55760)
(6373,55764)(6379,55767)(6389,55771)(6397,55775)(6421,55779)
(6427,55782)(6449,55786)(6451,55790)(6469,55793)(6473,55797)
(6481,55801)(6491,55804)(6521,55808)(6529,55812)(6547,55815)
(6551,55819)(6553,55822)(6563,55826)(6569,55830)(6571,55833)
(6577,55837)(6581,55841)(6599,55844)(6607,55848)(6619,55851)
(6637,55855)(6653,55859)(6659,55862)(6661,55866)(6673,55869)
(6679,55873)(6689,55877)(6691,55880)(6701,55884)(6703,55887)
(6709,55891)(6719,55894)(6733,55898)(6737,55902)(6761,55905)
(6763,55909)(6779,55912)(6781,55916)(6791,55919)(6793,55923)
(6803,55926)(6823,55930)(6827,55933)(6829,55937)(6833,55940)
(6841,55944)(6857,55948)(6863,55951)(6869,55955)(6871,55958)
(6883,55962)(6899,55965)(6907,55969)(6911,55972)(6917,55976)
(6947,55979)(6949,55983)(6959,55986)(6961,55990)(6967,55993)
(6971,55997)(6977,56000)(6983,56003)(6991,56007)(6997,56010)
(7001,56014)(7013,56017)(7019,56021)(7027,56024)(7039,56028)
(7043,56031)(7057,56035)(7069,56038)(7079,56042)(7103,56045)
(7109,56048)(7121,56052)(7127,56055)(7129,56059)(7151,56062)
(7159,56066)(7177,56069)(7187,56072)(7193,56076)(7207,56079)
(7211,56083)(7213,56086)(7219,56089)(7229,56093)(7237,56096)
(7243,56100)(7247,56103)(7253,56106)(7283,56110)(7297,56113)
(7307,56116)(7309,56120)(7321,56123)(7331,56127)(7333,56130)
(7349,56133)(7351,56137)(7369,56140)(7393,56143)(7411,56147)
(7417,56150)(7433,56153)(7451,56157)(7457,56160)(7459,56163)
(7477,56167)(7481,56170)(7487,56173)(7489,56177)(7499,56180)
(7507,56183)(7517,56187)(7523,56190)(7529,56193)(7537,56197)
(7541,56200)(7547,56203)(7549,56206)(7559,56210)(7561,56213)
(7573,56216)(7577,56220)(7583,56223)(7589,56226)(7591,56230)
(7603,56233)(7607,56236)(7621,56239)(7639,56243)(7643,56246)
(7649,56249)(7669,56253)(7673,56256)(7681,56259)(7687,56262)
(7691,56266)(7699,56269)(7703,56272)(7717,56275)(7723,56279)
(7727,56282)(7741,56285)(7753,56288)(7757,56292)(7759,56295)
(7789,56298)(7793,56301)(7817,56305)(7823,56308)(7829,56311)
(7841,56314)(7853,56318)(7867,56321)(7873,56324)(7877,56327)
(7879,56330)(7883,56334)(7901,56337)(7907,56340)(7919,56343)
(7927,56346)(7933,56350)(7937,56353)(7949,56356)(7951,56359)
(7963,56362)(7993,56366)(8009,56369)(8011,56372)(8017,56375)
(8039,56378)(8053,56382)(8059,56385)(8069,56388)(8081,56391)
(8087,56394)(8089,56397)(8093,56401)(8101,56404)(8111,56407)
(8117,56410)(8123,56413)(8147,56416)(8161,56419)(8167,56423)
(8171,56426)(8179,56429)(8191,56432)(8209,56435)(8219,56438)
(8221,56441)(8231,56445)(8233,56448)(8237,56451)(8243,56454)
(8263,56457)(8269,56460)(8273,56463)(8287,56466)(8291,56470)
(8293,56473)(8297,56476)(8311,56479)(8317,56482)(8329,56485)
(8353,56488)(8363,56491)(8369,56494)(8377,56498)(8387,56501)
(8389,56504)(8419,56507)(8423,56510)(8429,56513)(8431,56516)
(8443,56519)(8447,56522)(8461,56525)(8467,56528)(8501,56532)
(8513,56535)(8521,56538)(8527,56541)(8537,56544)(8539,56547)
(8543,56550)(8563,56553)(8573,56556)(8581,56559)(8597,56562)
(8599,56565)(8609,56568)(8623,56571)(8627,56574)(8629,56577)
(8641,56580)(8647,56584)(8663,56587)(8669,56590)(8677,56593)
(8681,56596)(8689,56599)(8693,56602)(8699,56605)(8707,56608)
(8713,56611)(8719,56614)(8731,56617)(8737,56620)(8741,56623)
(8747,56626)(8753,56629)(8761,56632)(8779,56635)(8783,56638)
(8803,56641)(8807,56644)(8819,56647)(8821,56650)(8831,56653)
(8837,56656)(8839,56659)(8849,56662)(8861,56665)(8863,56668)
(8867,56671)(8887,56674)(8893,56677)(8923,56680)(8929,56683)
(8933,56686)(8941,56689)(8951,56692)(8963,56695)(8969,56698)
(8971,56701)(8999,56704)(9001,56707)(9007,56710)(9011,56713)
(9013,56716)(9029,56719)(9041,56722)(9043,56725)(9049,56728)
(9059,56731)(9067,56734)(9091,56737)(9103,56740)(9109,56743)
(9127,56746)(9133,56749)(9137,56752)(9151,56754)(9157,56757)
(9161,56760)(9173,56763)(9181,56766)(9187,56769)(9199,56772)
(9203,56775)(9209,56778)(9221,56781)(9227,56784)(9239,56787)
(9241,56790)(9257,56793)(9277,56796)(9281,56799)(9283,56802)
(9293,56804)(9311,56807)(9319,56810)(9323,56813)(9337,56816)
(9341,56819)(9343,56822)(9349,56825)(9371,56828)(9377,56831)
(9391,56834)(9397,56837)(9403,56839)(9413,56842)(9419,56845)
(9421,56848)(9431,56851)(9433,56854)(9437,56857)(9439,56860)
(9461,56863)(9463,56866)(9467,56869)(9473,56871)(9479,56874)
(9491,56877)(9497,56880)(9511,56883)(9521,56886)(9533,56889)
(9539,56892)(9547,56895)(9551,56897)(9587,56900)(9601,56903)
(9613,56906)(9619,56909)(9629,56912)(9629,56915)(9631,56918)
(9643,56921)(9649,56923)(9661,56926)(9677,56929)(9679,56932)
(9689,56935)(9697,56938)(9719,56941)(9721,56943)(9733,56946)
(9739,56949)(9743,56952)(9749,56955)(9767,56958)(9769,56961)
(9781,56963)(9787,56966)(9791,56969)(9803,56972)(9811,56975)
(9817,56978)(9829,56981)(9833,56983)(9839,56986)(9851,56989)
(9857,56992)(9859,56995)(9871,56998)(9883,57001)(9887,57003)
(9901,57006)(9907,57009)(9923,57012)(9929,57015)(9931,57018)
(9941,57020)(9949,57023)(9967,57026)(9973,57029)(10007,57032)
(10009,57035)(10037,57037)(10039,57040)(10061,57043)(10067,57046)
(10069,57049)(10079,57051)(10091,57054)(10093,57057)(10099,57060)
(10103,57063)(10111,57065)(10133,57068)(10139,57071)(10141,57074)
(10151,57077)(10159,57080)(10163,57082)(10169,57085)(10177,57088)
(10181,57091)(10193,57094)(10211,57096)(10223,57099)(10243,57102)
(10247,57105)(10253,57108)(10259,57110)(10267,57113)(10271,57116)
(10273,57119)(10289,57122)(10301,57124)(10303,57127)(10313,57130)
(10321,57133)(10331,57135)(10333,57138)(10337,57141)(10343,57144)
(10357,57147)(10369,57149)(10391,57152)(10399,57155)(10427,57158)
(10429,57160)(10433,57163)(10453,57166)(10457,57169)(10459,57172)
(10463,57174)(10477,57177)(10487,57180)(10499,57183)(10501,57185)
(10513,57188)(10529,57191)(10531,57194)(10559,57196)(10567,57199)
(10589,57202)(10597,57205)(10601,57207)(10607,57210)(10613,57213)
(10627,57216)(10631,57218)(10639,57221)(10651,57224)(10657,57227)
(10663,57230)(10667,57232)(10687,57235)(10691,57238)(10709,57240)
(10711,57243)(10723,57246)(10729,57249)(10733,57251)(10739,57254)
(10753,57257)(10771,57260)(10781,57262)(10789,57265)(10799,57268)
(10831,57271)(10837,57273)(10847,57276)(10853,57279)(10859,57282)
(10861,57284)(10867,57287)(10883,57290)(10889,57292)(10891,57295)
(10903,57298)(10909,57301)(10937,57303)(10939,57306)(10949,57309)
(10957,57312)(10973,57314)(10979,57317)(10987,57320)(10993,57322)
(11003,57325)(11027,57328)(11047,57330)(11057,57333)(11059,57336)
(11069,57339)(11071,57341)(11083,57344)(11087,57347)(11093,57349)
(11113,57352)(11117,57355)(11119,57357)(11131,57360)(11149,57363)
(11159,57365)(11161,57368)(11171,57371)(11173,57374)(11177,57376)
(11197,57379)(11213,57382)(11239,57384)(11243,57387)(11251,57390)
(11257,57392)(11261,57395)(11273,57398)(11279,57400)(11287,57403)
(11299,57405)(11311,57408)(11317,57411)(11321,57413)(11329,57416)
(11351,57419)(11353,57421)(11369,57424)(11383,57427)(11393,57429)
(11399,57432)(11411,57435)(11423,57437)(11437,57440)(11443,57443)
(11447,57445)(11467,57448)(11471,57450)(11483,57453)(11489,57456)
(11491,57458)(11497,57461)(11503,57464)(11519,57466)(11527,57469)
(11549,57471)(11551,57474)(11579,57477)(11587,57479)(11593,57482)
(11597,57484)(11617,57487)(11621,57490)(11633,57492)(11657,57495)
(11677,57497)(11681,57500)(11689,57503)(11699,57505)(11701,57508)
(11717,57510)(11719,57513)(11731,57516)(11743,57518)(11777,57521)
(11779,57523)(11783,57526)(11789,57528)(11801,57531)(11807,57534)
(11813,57536)(11821,57539)(11827,57541)(11831,57544)(11833,57546)

TABLE 1-continued (11839,57549)(11863,57552)(11867,57554)(11887,57557)(11897,57559)
(11903,57562)(11909,57564)(11923,57567)(11927,57569)(11933,57572)
(11939,57575)(11941,57577)(11953,57580)(11959,57582)(11969,57585)
(11971,57587)(11981,57590)(11987,57592)(12007,57595)(12011,57597)
(12037,57600)(12041,57603)(12043,57605)(12049,57608)(12071,57610)
(12073,57613)(12097,57615)(12101,57618)(12107,57620)(12109,57623)
(12113,57625)(12119,57628)(12143,57630)(12149,57633)(12157,57635)
(12161,57638)(12163,57640)(12197,57643)(12203,57645)(12211,57648)
(12227,57650)(12239,57653)(12241,57655)(12251,57658)(12253,57660)
(12263,57663)(12269,57665)(12277,57668)(12281,57670)(12289,57673)
(12301,57675)(12323,57678)(12329,57680)(12343,57683)(12347,57685)
(12373,57688)(12377,57690)(12379,57693)(12391,57695)(12401,57698)
(12409,57700)(12413,57703)(12421,57705)(12433,57708)(12437,57710)
(12451,57713)(12457,57715)(12473,57718)(12479,57720)(12487,57723)
(12491,57725)(12497,57728)(12503,57730)(12511,57733)(12517,57735)
(12527,57737)(12539,57740)(12541,57742)(12547,57745)(12553,57747)
(12569,57750)(12577,57752)(12583,57755)(12589,57757)(12601,57760)
(12611,57762)(12613,57764)(12619,57767)(12637,57769)(12641,57772)
(12647,57774)(12653,57777)(12659,57779)(12671,57782)(12689,57784)
(12697,57787)(12703,57789)(12713,57791)(12721,57794)(12739,57796)
(12743,57799)(12757,57801)(12763,57804)(12781,57806)(12791,57808)
(12799,57811)(12809,57813)(12821,57816)(12823,57818)(12829,57821)
(12841,57823)(12853,57825)(12889,57828)(12893,57830)(12899,57833)
(12907,57835)(12911,57838)(12917,57840)(12919,57842)(12923,57845)
(12941,57847)(12953,57850)(12959,57852)(12967,57854)(12973,57857)
(12979,57859)(12983,57862)(13001,57864)(13003,57866)(13007,57869)
(13009,57871)(13033,57874)(13037,57876)(13043,57878)(13049,57881)
(13063,57883)(13093,57886)(13099,57888)(13103,57890)(13109,57893)
(13121,57895)(13127,57898)(13147,57900)(13151,57902)(13159,57905)
(13163,57907)(13171,57909)(13177,57912)(13183,57914)(13187,57917)
(13217,57919)(13219,57921)(13229,57924)(13241,57926)(13249,57928)
(13259,57931)(13267,57933)(13291,57936)(13297,57938)(13309,57940)
(13313,57943)(13327,57945)(13331,57947)(13337,57950)(13339,57952)
(13367,57954)(13381,57957)(13397,57959)(13399,57962)(13411,57964)
(13417,57966)(13421,57969)(13441,57971)(13451,57973)(13457,57976)
(13463,57978)(13469,57980)(13477,57983)(13487,57985)(13499,57987)
(13513,57990)(13523,57992)(13537,57994)(13553,57997)(13567,57999)
(13577,58001)(13591,58004)(13597,58006)(13613,58008)(13619,58011)
(13627,58013)(13633,58015)(13649,58018)(13669,58020)(13679,58022)
(13681,58025)(13687,58027)(13691,58029)(13693,58032)(13697,58034)
(13709,58036)(13711,58039)(13721,58041)(13723,58043)(13729,58046)
(13751,58048)(13757,58050)(13759,58052)(13763,58055)(13781,58057)
(13789,58059)(13799,58062)(13807,58064)(13829,58066)(13831,58069)
(13841,58071)(13859,58073)(13873,58076)(13877,58078)(13879,58080)
(13883,58082)(13901,58085)(13903,58087)(13907,58089)(13913,58092)
(13921,58094)(13931,58096)(13933,58098)(13963,58101)(13967,58103)
(13997,58105)(13999,58108)(14009,58110)(14011,58112)(14029,58114)
(14033,58117)(14051,58119)(14057,58121)(14071,58124)(14081,58126)
(14083,58128)(14087,58130)(14107,58133)(14143,58135)(14149,58137)
(14153,58140)(14159,58142)(14173,58144)(14177,58146)(14197,58149)
(14207,58151)(14221,58153)(14243,58155)(14249,58158)(14251,58160)
(14281,58162)(14293,58164)(14303,58167)(14321,58169)(14323,58171)
(14327,58173)(14341,58176)(14347,58178)(14369,58180)(14387,58182)
(14389,58185)(14401,58187)(14407,58189)(14411,58191)(14419,58194)
(14423,58196)(14431,58198)(14437,58200)(14447,58203)(14449,58205)
(14461,58207)(14479,58209)(14489,58212)(14503,58214)(14519,58216)
(14533,58218)(14537,58221)(14543,58223)(14549,58225)(14551,58227)
(14557,58229)(14561,58232)(14563,58234)(14591,58236)(14593,58238)
(14621,58241)(14627,58243)(14629,58245)(14633,58247)(14639,58249)
(14653,58252)(14657,58254)(14669,58256)(14683,58258)(14699,58261)
(14713,58263)(14717,58265)(14723,58267)(14731,58269)(14737,58272)
(14741,58274)(14747,58276)(14753,58278)(14759,58280)(14767,58283)
(14771,58285)(14779,58287)(14783,58289)(14797,58291)(14813,58294)
(14821,58296)(14827,58298)(14831,58300)(14843,58303)(14851,58305)
(14867,58307)(14869,58309)(14879,58311)(14887,58314)(14891,58316)
(14897,58318)(14923,58320)(14929,58322)(14939,58324)(14947,58327)
(14951,58329)(14957,58331)(14969,58333)(14983,58335)(15013,58338)
(15017,58340)(15031,58342)(15053,58344)(15061,58346)(15073,58349)
(15077,58351)(15083,58353)(15091,58355)(15101,58357)(15107,58359)
(15121,58362)(15131,58364)(15137,58366)(15139,58368)(15149,58370)
(15161,58372)(15173,58375)(15187,58377)(15193,58379)(15199,58381)
(15217,58383)(15227,58386)(15233,58388)(15241,58390)(15259,58392)
(15263,58394)(15269,58396)(15271,58399)(15277,58401)(15287,58403)
(15289,58405)(15299,58407)(15307,58409)(15313,58411)(15319,58414)
(15329,58416)(15331,58418)(15349,58420)(15359,58422)(15361,58424)
(15373,58427)(15377,58429)(15383,58431)(15391,58433)(15401,58435)
(15413,58437)(15427,58439)(15439,58442)(15443,58444)(15451,58446)
(15461,58448)(15467,58450)(15473,58452)(15493,58455)(15497,58457)
(15511,58459)(15527,58461)(15541,58463)(15551,58465)(15559,58467)
(15569,58470)(15581,58472)(15583,58474)(15601,58476)(15607,58478)
(15619,58480)(15629,58482)(15641,58484)(15643,58487)(15647,58489)
(15649,58491)(15661,58493)(15667,58495)(15671,58497)(15679,58499)
(15683,58502)(15727,58504)(15731,58506)(15733,58508)(15737,58510)
(15739,58512)(15749,58514)(15761,58516)(15767,58519)(15773,58521)
(15787,58523)(15791,58525)(15797,58527)(15803,58529)(15809,58531)
(15817,58533)(15823,58535)(15859,58538)(15877,58540)(15881,58542)
(15887,58544)(15889,58546)(15901,58548)(15907,58550)(15913,58552)
(15919,58554)(15923,58557)(15937,58559)(15959,58561)(15971,58563)
(15973,58565)(15991,58567)(16001,58569)(16007,58571)(16033,58573)
(16057,58576)(16061,58578)(16063,58580)(16067,58582)(16069,58584)
(16073,58586)(16087,58588)(16091,58590)(16097,58592)(16103,58594)
(16111,58597)(16127,58599)(16139,58601)(16141,58603)(16183,58605)
(16187,58607)(16189,58609)(16193,58611)(16217,58613)(16223,58615)
(16229,58617)(16231,58619)(16249,58622)(16253,58624)(16267,58626)
(16273,58628)(16301,58630)(16319,58632)(16333,58634)(16339,58636)
(16349,58638)(16361,58640)(16363,58642)(16369,58644)(16381,58647)
(16411,58649)(16417,58651)(16421,58653)(16427,58655)(16433,58657)
(16447,58659)(16451,58661)(16453,58663)(16477,58665)(16481,58667)
(16487,58669)(16493,58671)(16519,58673)(16529,58676)(16547,58678)
(16553,58680)(16561,58682)(16567,58684)(16573,58686)(16603,58688)
(16607,58690)(16619,58692)(16631,58694)(16633,58696)(16649,58698)
(16651,58700)(16657,58702)(16661,58704)(16673,58706)(16691,58708)
(16693,58711)(16699,58713)(16703,58715)(16729,58717)(16741,58719)
(16747,58721)(16759,58723)(16763,58725)(16787,58727)(16811,58729)
(16823,58731)(16829,58733)(16831,58735)(16843,58737)(16871,58739)
(16879,58741)(16883,58743)(16889,58745)(16901,58747)(16903,58749)
(16921,58751)(16927,58753)(16931,58756)(16937,58758)(16943,58760)
(16963,58762)(16979,58764)(16981,58766)(16987,58768)(16993,58770)
(17011,58772)(17021,58774)(17027,58776)(17029,58778)(17033,58780)
(17041,58782)(17047,58784)(17053,58786)(17077,58788)(17093,58790)
(17099,58792)(17107,58794)(17117,58796)(17123,58798)(17137,58800)
(17159,58802)(17167,58804)(17183,58806)(17189,58808)(17191,58810)
(17203,58812)(17207,58814)(17209,58816)(17231,58818)(17239,58820)
(17257,58822)(17291,58824)(17293,58826)(17299,58828)(17317,58830)
(17321,58832)(17327,58834)(17333,58836)(17341,58838)(17351,58841)
(17359,58843)(17377,58845)(17383,58847)(17387,58849)(17389,58851)
(17393,58853)(17401,58855)(17417,58857)(17419,58859)(17431,58861)
(17443,58863)(17449,58865)(17467,58867)(17471,58869)(17477,58871)
(17483,58873)(17489,58875)(17491,58877)(17497,58879)(17509,58881)
(17519,58883)(17539,58885)(17551,58887)(17569,58889)(17573,58891)
(17579,58893)(17581,58895)(17597,58897)(17599,58899)(17609,58901)
(17623,58903)(17627,58905)(17657,58907)(17659,58909)(17669,58911)
(17681,58913)(17683,58915)(17707,58917)(17713,58919)(17729,58921)
(17737,58922)(17747,58924)(17749,58926)(17761,58928)(17783,58930)
(17789,58932)(17791,58934)(17807,58936)(17827,58938)(17837,58940)
(17839,58942)(17851,58944)(17863,58946)(17881,58948)(17891,58950)
(17903,58952)(17909,58954)(17911,58956)(17921,58958)(17923,58960)
(17929,58962)(17939,58964)(17957,58966)(17959,58968)(17971,58970)
(17977,58972)(17981,58974)(17987,58976)(17989,58978)(18013,58980)
(18041,58982)(18043,58984)(18047,58986)(18049,58988)(18059,58990)
(18061,58992)(18077,58994)(18089,58996)(18097,58998)(18119,59000)
(18121,59002)(18127,59003)(18131,59005)(18133,59007)(18143,59009)
(18149,59011)(18169,59013)(18181,59015)(18191,59017)(18199,59019)
(18211,59021)(18217,59023)(18223,59025)(18229,59027)(18233,59029)
(18251,59031)(18253,59033)(18257,59035)(18269,59037)(18287,59039)
(18289,59041)(18301,59043)(18307,59045)(18311,59047)(18313,59049)
(18329,59051)(18341,59052)(18353,59054)(18367,59056)(18371,59058)
(18379,59060)(18397,59062)(18401,59064)(18413,59066)(18427,59068)
(18433,59070)(18439,59072)(18443,59074)(18451,59076)(18457,59078)
(18461,59080)(18481,59082)(18493,59084)(18503,59086)(18517,59088)
(18521,59090)(18523,59091)(18539,59093)(18541,59095)(18553,59097)
(18583,59099)(18587,59101)(18593,59103)(18617,59105)(18637,59107)
(18661,59109)(18671,59111)(18679,59113)(18691,59115)(18701,59117)
(18713,59119)(18719,59121)(18731,59122)(18743,59124)(18749,59126)
(18757,59128)(18773,59130)(18787,59132)(18793,59134)(18797,59136)
(18803,59138)(18839,59140)(18859,59142)(18869,59144)(18899,59146)
(18911,59148)(18913,59150)(18917,59151)(18919,59153)(18947,59155)
(18959,59157)(18973,59159)(18979,59161)(19001,59163)(19009,59165)
(19013,59167)(19031,59169)(19037,59171)(19051,59173)(19069,59174)
(19073,59176)(19079,59178)(19081,59180)(19087,59182)(19121,59184)
(19139,59186)(19141,59188)(19157,59190)(19163,59192)(19181,59194)
(19183,59196)(19207,59197)(19211,59199)(19213,59201)(19219,59203)
(19231,59205)(19237,59207)(19249,59209)(19259,59211)(19267,59213)
(19273,59215)(19289,59217)(19301,59218)(19309,59220)(19319,59222)
(19333,59224)(19373,59226)(19379,59228)(19381,59230)(19387,59232)
(19391,59234)(19403,59236)(19417,59238)(19421,59239)(19423,59241)
(19427,59243)(19429,59245)(19433,59247)(19441,59249)(19447,59251)
(19457,59253)(19463,59255)(19469,59257)(19471,59258)(19477,59260)

TABLE 1-continued (19483,59262)(19489,59264)(19501,59266)(19507,59268)(19531,59270)
(19541,59272)(19543,59274)(19553,59276)(19559,59277)(19571,59279)
(19577,59281)(19583,59283)(19597,59285)(19603,59287)(19609,59289)
(19661,59291)(19681,59293)(19687,59294)(19697,59296)(19699,59298)
(19709,59300)(19717,59302)(19727,59304)(19739,59306)(19751,59308)
(19753,59310)(19759,59311)(19763,59313)(19777,59315)(19793,59317)
(19801,59319)(19813,59321)(19819,59323)(19841,59325)(19843,59327)
(19853,59328)(19861,59330)(19867,59332)(19889,59334)(19891,59336)
(19913,59338)(19919,59340)(19927,59342)(19937,59343)(19949,59345)
(19961,59347)(19963,59349)(19973,59351)(19979,59353)(19991,59355)
(19993,59357)(19997,59358)(20011,59360)(20021,59362)(20023,59364)
(20029,59366)(20047,59368)(20051,59370)(20063,59372)(20071,59374)
(20089,59375)(20101,59377)(20107,59379)(20113,59381)(20117,59383)
(20123,59385)(20129,59387)(20143,59388)(20147,59390)(20149,59392)
(20161,59394)(20173,59396)(20177,59398)(20183,59400)(20201,59402)
(20219,59403)(20231,59405)(20233,59407)(20249,59409)(20261,59411)
(20269,59413)(20287,59415)(20297,59417)(20323,59418)(20327,59420)
(20333,59422)(20341,59424)(20347,59426)(20353,59428)(20357,59430)
(20359,59431)(20369,59433)(20389,59435)(20393,59437)(20399,59439)
(20407,59441)(20411,59443)(20431,59444)(20441,59446)(20443,59448)
(20477,59450)(20479,59452)(20483,59454)(20507,59456)(20509,59458)
(20521,59459)(20533,59461)(20543,59463)(20549,59465)(20551,59467)
(20563,59469)(20593,59471)(20599,59472)(20611,59474)(20627,59476)
(20639,59478)(20641,59480)(20663,59482)(20681,59483)(20693,59485)
(20707,59487)(20717,59489)(20719,59491)(20731,59493)(20743,59495)
(20747,59496)(20749,59498)(20753,59500)(20759,59502)(20771,59504)
(20773,59506)(20789,59508)(20807,59509)(20809,59511)(20849,59513)
(20857,59515)(20873,59517)(20879,59519)(20887,59520)(20897,59522)
(20899,59524)(20903,59526)(20921,59528)(20929,59530)(20939,59532)
(20947,59533)(20959,59535)(20963,59537)(20981,59539)(20983,59541)
(21001,59543)(21011,59544)(21013,59546)(21017,59548)(21019,59550)
(21023,59552)(21031,59554)(21059,59555)(21061,59557)(21067,59559)
(21089,59561)(21101,59563)(21107,59565)(21121,59567)(21139,59568)
(21143,59570)(21149,59572)(21157,59574)(21163,59576)(21169,59578)
(21179,59579)(21187,59581)(21191,59583)(21193,59585)(21211,59587)
(21221,59589)(21227,59590)(21247,59592)(21269,59594)(21277,59596)
(21283,59598)(21313,59600)(21317,59601)(21319,59603)(21323,59605)
(21341,59607)(21347,59609)(21377,59611)(21379,59612)(21383,59614)
(21391,59616)(21397,59618)(21401,59620)(21407,59622)(21419,59623)
(21433,59625)(21467,59627)(21481,59629)(21487,59631)(21491,59632)
(21493,59634)(21499,59636)(21503,59638)(21517,59640)(21521,59642)
(21523,59643)(21529,59645)(21557,59647)(21559,59649)(21563,59651)
(21569,59653)(21577,59654)(21587,59656)(21589,59658)(21599,59660)
(21601,59662)(21611,59663)(21613,59665)(21617,59667)(21647,59669)
(21649,59671)(21661,59673)(21673,59674)(21683,59676)(21701,59678)
(21713,59680)(21727,59682)(21737,59684)(21739,59685)(21751,59687)
(21757,59689)(21767,59691)(21773,59693)(21787,59694)(21799,59696)
(21803,59698)(21817,59700)(21821,59702)(21839,59704)(21841,59705)
(21851,59707)(21859,59709)(21863,59711)(21871,59713)(21881,59714)
(21893,59716)(21911,59718)(21929,59720)(21937,59722)(21943,59723)
(21961,59725)(21977,59727)(21991,59729)(21997,59731)(22003,59733)
(22013,59734)(22027,59736)(22031,59738)(22037,59740)(22039,59742)
(22051,59743)(22063,59745)(22067,59747)(22073,59749)(22079,59751)
(22091,59752)(22093,59754)(22109,59756)(22111,59758)(22123,59760)
(22129,59761)(22133,59763)(22147,59765)(22153,59767)(22157,59769)
(22159,59771)(22171,59772)(22189,59774)(22193,59776)(22229,59778)
(22247,59780)(22259,59781)(22271,59783)(22273,59785)(22277,59787)
(22279,59789)(22283,59790)(22291,59792)(22303,59794)(22307,59796)
(22343,59798)(22349,59799)(22367,59801)(22369,59803)(22381,59805)
(22391,59807)(22397,59808)(22409,59810)(22433,59812)(22441,59814)
(22447,59816)(22453,59817)(22469,59819)(22481,59821)(22483,59823)
(22501,59825)(22511,59826)(22531,59828)(22541,59830)(22543,59832)
(22549,59834)(22567,59835)(22571,59837)(22573,59839)(22613,59841)
(22619,59843)(22621,59844)(22637,59846)(22639,59848)(22643,59850)
(22651,59852)(22669,59853)(22679,59855)(22691,59857)(22697,59859)
(22699,59861)(22709,59862)(22717,59864)(22721,59866)(22727,59868)
(22739,59870)(22741,59871)(22751,59873)(22769,59875)(22777,59877)
(22783,59878)(22787,59880)(22807,59882)(22811,59884)(22817,59886)
(22853,59887)(22859,59889)(22861,59891)(22871,59893)(22877,59895)
(22901,59896)(22907,59898)(22921,59900)(22937,59902)(22943,59904)
(22961,59905)(22963,59907)(22973,59909)(22993,59911)(23003,59912)
(23011,59914)(23017,59916)(23021,59918)(23027,59920)(23029,59921)
(23039,59923)(23041,59925)(23053,59927)(23057,59929)(23059,59930)
(23063,59932)(23071,59934)(23081,59936)(23087,59938)(23099,59939)
(23117,59941)(23131,59943)(23143,59945)(23159,59946)(23167,59948)
(23173,59950)(23189,59952)(23197,59954)(23201,59955)(23203,59957)
(23209,59959)(23227,59961)(23251,59962)(23269,59964)(23279,59966)
(23291,59968)(23293,59970)(23297,59971)(23311,59973)(23321,59975)
(23327,59977)(23333,59979)(23339,59980)(23357,59982)(23369,59984)
(23371,59986)(23399,59987)(23417,59989)(23431,59991)(23447,59993)
(23459,59995)(23473,59996)(23497,59998)(23509,60000)(23531,60002)
(23537,60003)(23539,60005)(23549,60007)(23557,60009)(23561,60011)
(23563,60012)(23567,60014)(23581,60016)(23593,60018)(23599,60019)
(23603,60021)(23609,60023)(23623,60025)(23627,60027)(23629,60028)
(23633,60030)(23663,60032)(23669,60034)(23671,60035)(23677,60037)
(23687,60039)(23689,60041)(23719,60043)(23741,60044)(23743,60046)
(23747,60048)(23753,60050)(23761,60051)(23767,60053)(23773,60055)
(23789,60057)(23801,60058)(23813,60060)(23819,60062)(23827,60064)
(23831,60066)(23833,60067)(23857,60069)(23869,60071)(23873,60073)
(23879,60074)(23887,60076)(23893,60078)(23899,60080)(23909,60081)
(23911,60083)(23917,60085)(23929,60087)(23957,60089)(23971,60090)
(23977,60092)(23981,60094)(23993,60096)(24001,60097)(24007,60099)
(24019,60101)(24023,60103)(24029,60104)(24043,60106)(24049,60108)
(24061,60110)(24071,60112)(24077,60113)(24083,60115)(24091,60117)
(24097,60119)(24103,60120)(24107,60122)(24109,60124)(24113,60126)
(24121,60127)(24133,60129)(24137,60131)(24151,60133)(24169,60135)
(24179,60136)(24181,60138)(24197,60140)(24203,60142)(24223,60143)
(24229,60145)(24239,60147)(24247,60149)(24251,60150)(24281,60152)
(24317,60154)(24329,60156)(24337,60158)(24359,60159)(24371,60161)
(24373,60163)(24379,60165)(24391,60166)(24407,60168)(24413,60170)
(24419,60172)(24421,60173)(24439,60175)(24443,60177)(24469,60179)
(24473,60180)(24481,60182)(24499,60184)(24509,60186)(24517,60187)
(24527,60189)(24533,60191)(24547,60193)(24551,60195)(24571,60196)
(24593,60198)(24611,60200)(24623,60202)(24631,60203)(24659,60205)
(24671,60207)(24677,60209)(24683,60210)(24691,60212)(24697,60214)
(24709,60216)(24733,60217)(24749,60219)(24763,60221)(24767,60223)
(24781,60224)(24793,60226)(24799,60228)(24809,60230)(24821,60231)
(24841,60233)(24847,60235)(24851,60237)(24869,60238)(24877,60240)
(24889,60242)(24907,60244)(24917,60246)(24919,60247)(24923,60249)
(24943,60251)(24953,60253)(24967,60254)(24971,60256)(24977,60258)
(24979,60260)(24989,60261)(25013,60263)(25031,60265)(25033,60267)
(25037,60268)(25057,60270)(25073,60272)(25087,60273)(25097,60275)
(25111,60277)(25117,60279)(25121,60281)(25127,60282)(25147,60284)
(25153,60286)(25163,60288)(25169,60289)(25171,60291)(25183,60293)
(25189,60295)(25219,60296)(25229,60298)(25237,60300)(25243,60302)
(25247,60303)(25253,60305)(25261,60307)(25301,60309)(25303,60310)
(25307,60312)(25309,60314)(25321,60316)(25339,60317)(25343,60319)
(25349,60321)(25357,60323)(25367,60324)(25373,60326)(25391,60328)
(25409,60330)(25411,60331)(25423,60333)(25439,60335)(25447,60337)
(25453,60338)(25457,60340)(25463,60342)(25469,60344)(25471,60345)
(25523,60347)(25537,60349)(25541,60351)(25561,60352)(25577,60354)
(25579,60356)(25583,60358)(25589,60359)(25601,60361)(25603,60363)
(25609,60365)(25621,60367)(25633,60368)(25639,60370)(25643,60372)
(25657,60374)(25667,60375)(25673,60377)(25679,60379)(25693,60380)
(25703,60382)(25717,60384)(25733,60386)(25741,60387)(25747,60389)
(25759,60391)(25763,60393)(25771,60394)(25793,60396)(25799,60398)
(25801,60400)(25819,60401)(25841,60403)(25847,60405)(25849,60407)
(25867,60408)(25873,60410)(25889,60412)(25903,60414)(25913,60415)
(25919,60417)(25931,60419)(25933,60421)(25939,60422)(25943,60424)
(25951,60426)(25969,60428)(25981,60429)(25997,60431)(25999,60433)
(26003,60435)(26017,60436)(26021,60438)(26029,60440)(26041,60442)
(26053,60443)(26083,60445)(26099,60447)(26107,60449)(26111,60450)
(26113,60452)(26119,60454)(26141,60456)(26153,60457)(26161,60459)
(26171,60461)(26177,60463)(26183,60464)(26189,60466)(26203,60468)
(26209,60470)(26227,60471)(26237,60473)(26249,60475)(26251,60477)
(26261,60478)(26263,60480)(26267,60482)(26293,60484)(26297,60485)
(26309,60487)(26317,60489)(26321,60491)(26339,60492)(26347,60494)
(26357,60496)(26371,60498)(26387,60499)(26393,60501)(26399,60503)
(26407,60505)(26417,60506)(26423,60508)(26431,60510)(26437,60512)
(26449,60513)(26459,60515)(26479,60517)(26489,60519)(26497,60520)
(26501,60522)(26513,60524)(26539,60525)(26557,60527)(26561,60529)
(26573,60531)(26591,60532)(26597,60534)(26627,60536)(26633,60538)
(26641,60539)(26647,60541)(26669,60543)(26681,60545)(26683,60546)
(26687,60548)(26693,60550)(26699,60552)(26701,60553)(26711,60555)
(26713,60557)(26717,60559)(26723,60560)(26729,60562)(26731,60564)
(26737,60566)(26759,60567)(26777,60569)(26783,60571)(26801,60573)
(26813,60574)(26821,60576)(26833,60578)(26839,60580)(26849,60581)
(26861,60583)(26863,60585)(26879,60587)(26881,60588)(26891,60590)
(26893,60592)(26903,60594)(26921,60595)(26927,60597)(26947,60599)
(26951,60600)(26953,60602)(26959,60604)(26981,60606)(26987,60607)
(26993,60609)(27011,60611)(27017,60613)(27031,60614)(27043,60616)
(27059,60618)(27061,60620)(27067,60621)(27073,60623)(27077,60625)
(27091,60627)(27103,60628)(27107,60630)(27109,60632)(27127,60634)
(27143,60635)(27179,60637)(27191,60639)(27197,60641)(27211,60642)
(27239,60644)(27241,60646)(27253,60648)(27259,60649)(27271,60651)
(27277,60653)(27281,60655)(27283,60656)(27299,60658)(27329,60660)
(27337,60662)(27361,60663)(27367,60665)(27397,60667)(27407,60668)
(27409,60670)(27427,60672)(27431,60674)(27437,60675)(27449,60677)

TABLE 1-continued (27457,60679)(27479,60681)(27481,60682)(27487,60684)(27509,60686)
(27527,60688)(27529,60689)(27539,60691)(27541,60693)(27551,60695)
(27581,60696)(27583,60698)(27611,60700)(27617,60702)(27631,60703)
(27647,60705)(27653,60707)(27673,60709)(27689,60710)(27691,60712)
(27697,60714)(27701,60716)(27733,60717)(27737,60719)(27739,60721)
(27743,60723)(27749,60724)(27751,60726)(27763,60728)(27767,60730)
(27773,60731)(27779,60733)(27791,60735)(27793,60736)(27799,60738)
(27803,60740)(27809,60742)(27817,60743)(27823,60745)(27827,60747)
(27847,60749)(27851,60750)(27883,60752)(27893,60754)(27901,60756)
(27917,60757)(27919,60759)(27941,60761)(27943,60763)(27947,60764)
(27953,60766)(27961,60768)(27967,60770)(27983,60771)(27997,60773)
(28001,60775)(28019,60777)(28027,60778)(28031,60780)(28051,60782)
(28057,60784)(28069,60785)(28081,60787)(28087,60789)(28097,60791)
(28099,60792)(28109,60794)(28111,60796)(28123,60798)(28151,60799)
(28163,60801)(28181,60803)(28183,60805)(28201,60806)(28211,60808)
(28219,60810)(28229,60812)(28277,60813)(28279,60815)(28283,60817)
(28289,60818)(28297,60820)(28307,60822)(28309,60824)(28319,60825)
(28349,60827)(28351,60829)(28387,60831)(28393,60832)(28403,60834)
(28409,60836)(28411,60838)(28429,60839)(28433,60841)(28439,60843)
(28447,60845)(28463,60846)(28477,60848)(28493,60850)(28499,60852)
(28513,60853)(28517,60855)(28537,60857)(28541,60859)(28547,60860)
(28549,60862)(28559,60864)(28571,60866)(28573,60867)(28579,60869)
(28591,60871)(28597,60873)(28603,60874)(28607,60876)(28619,60878)
(28621,60880)(28627,60881)(28631,60883)(28643,60885)(28649,60887)
(28657,60888)(28661,60890)(28663,60892)(28669,60894)(28687,60895)
(28697,60897)(28703,60899)(28711,60901)(28723,60902)(28729,60904)
(28751,60906)(28753,60908)(28759,60909)(28771,60911)(28789,60913)
(28793,60915)(28807,60916)(28813,60918)(28817,60920)(28837,60922)
(28843,60923)(28859,60925)(28867,60927)(28871,60929)(28879,60930)
(28901,60932)(28909,60934)(28921,60936)(28927,60937)(28933,60939)
(28949,60941)(28961,60943)(28979,60944)(29009,60946)(29017,60948)
(29021,60950)(29023,60951)(29027,60953)(29033,60955)(29059,60957)
(29063,60958)(29077,60960)(29101,60962)(29123,60964)(29129,60965)
(29131,60967)(29137,60969)(29147,60971)(29153,60972)(29167,60974)
(29173,60976)(29179,60978)(29191,60979)(29201,60981)(29207,60983)
(29209,60985)(29221,60986)(29231,60988)(29243,60990)(29251,60992)
(29269,60993)(29287,60995)(29297,60997)(29303,60999)(29311,61000)
(29327,61002)(29333,61004)(29339,61006)(29347,61007)(29363,61009)
(29383,61011)(29387,61013)(29389,61014)(29399,61016)(29401,61018)
(29411,61020)(29423,61021)(29429,61023)(29437,61025)(29443,61027)
(29453,61028)(29473,61030)(29483,61032)(29501,61034)(29527,61035)
(29531,61037)(29537,61039)(29567,61041)(29569,61042)(29573,61044)
(29581,61046)(29587,61048)(29599,61049)(29611,61051)(29629,61053)
(29633,61055)(29641,61057)(29663,61058)(29669,61060)(29671,61062)
(29683,61064)(29717,61065)(29723,61067)(29741,61069)(29753,61071)
(29759,61072)(29761,61074)(29789,61076)(29803,61078)(29819,61079)
(29833,61081)(29837,61083)(29851,61085)(29863,61086)(29867,61088)
(29873,61090)(29879,61092)(29881,61093)(29917,61095)(29921,61097)
(29927,61099)(29947,61100)(29959,61102)(29983,61104)(29989,61106)
(30011,61108)(30013,61109)(30029,61111)(30047,61113)(30059,61115)
(30071,61116)(30089,61118)(30091,61120)(30097,61122)(30103,61123)
(30109,61125)(30113,61127)(30119,61129)(30133,61130)(30137,61132)
(30139,61134)(30161,61136)(30169,61137)(30181,61139)(30187,61141)
(30197,61143)(30203,61145)(30211,61146)(30223,61148)(30241,61150)
(30253,61152)(30259,61153)(30269,61155)(30271,61157)(30293,61159)
(30307,61160)(30313,61162)(30319,61164)(30323,61166)(30341,61167)
(30347,61169)(30367,61171)(30389,61173)(30391,61175)(30403,61176)
(30427,61178)(30431,61180)(30449,61182)(30467,61183)(30469,61185)
(30491,61187)(30493,61189)(30497,61190)(30509,61192)(30517,61194)
(30529,61196)(30539,61197)(30553,61199)(30557,61201)(30559,61203)
(30577,61205)(30593,61206)(30631,61208)(30637,61210)(30643,61212)
(30649,61213)(30661,61215)(30671,61217)(30677,61219)(30689,61220)
(30697,61222)(30703,61224)(30707,61226)(30713,61228)(30727,61229)
(30757,61231)(30763,61233)(30773,61235)(30781,61236)(30803,61238)
(30809,61240)(30817,61242)(30829,61244)(30839,61245)(30841,61247)
(30851,61249)(30853,61251)(30859,61252)(30869,61254)(30871,61256)
(30881,61258)(30893,61259)(30911,61261)(30931,61263)(30937,61265)
(30941,61267)(30949,61268)(30971,61270)(30977,61272)(30983,61274)
(31013,61275)(31019,61277)(31033,61279)(31039,61281)(31051,61283)
(31063,61284)(31069,61286)(31079,61288)(31081,61290)(31091,61291)
(31121,61293)(31123,61295)(31139,61297)(31147,61299)(31151,61300)
(31153,61302)(31159,61304)(31177,61306)(31181,61307)(31183,61309)
(31189,61311)(31193,61313)(31219,61315)(31223,61316)(31231,61318)
(31237,61320)(31247,61322)(31249,61323)(31253,61325)(31259,61327)
(31267,61329)(31271,61331)(31277,61332)(31307,61334)(31319,61336)
(31321,61338)(31327,61340)(31333,61341)(31337,61343)(31357,61345)
(31379,61347)(31387,61348)(31391,61350)(31393,61352)(31397,61354)
(31469,61356)(31477,61357)(31481,61359)(31489,61361)(31511,61363)
(31513,61364)(31517,61366)(31531,61368)(31541,61370)(31543,61372)
(31547,61373)(31567,61375)(31573,61377)(31583,61379)(31601,61381)
(31607,61382)(31627,61384)(31643,61386)(31649,61388)(31657,61390)
(31663,61391)(31667,61393)(31687,61395)(31699,61397)(31721,61398)
(31723,61400)(31727,61402)(31729,61404)(31741,61406)(31751,61407)
(31769,61409)(31771,61411)(31793,61413)(31799,61415)(31817,61416)
(31847,61418)(31849,61420)(31859,61422)(31873,61424)(31883,61425)
(31891,61427)(31907,61429)(31957,61431)(31963,61433)(31973,61434)
(31981,61436)(31991,61438)(32003,61440)(32009,61441)(32027,61443)
(32029,61445)(32051,61447)(32057,61449)(32059,61450)(32063,61452)
(32069,61454)(32077,61456)(32083,61458)(32089,61459)(32099,61461)
(32117,61463)(32119,61465)(32141,61467)(32143,61468)(32159,61470)
(32173,61472)(32183,61474)(32189,61476)(32191,61477)(32203,61479)
(32213,61481)(32233,61483)(32237,61485)(32251,61486)(32257,61488)
(32261,61490)(32297,61492)(32299,61494)(32303,61496)(32309,61497)
(32321,61499)(32323,61501)(32327,61503)(32341,61505)(32353,61506)
(32359,61508)(32363,61510)(32369,61512)(32371,61514)(32377,61515)
(32381,61517)(32401,61519)(32411,61521)(32413,61523)(32423,61524)
(32429,61526)(32441,61528)(32443,61530)(32467,61532)(32479,61533)
(32491,61535)(32497,61537)(32503,61539)(32507,61541)(32531,61542)
(32533,61544)(32537,61546)(32561,61548)(32563,61549)(32569,61552)
(32573,61553)(32579,61555)(32587,61557)(32603,61559)(32609,61561)
(32611,61562)(32621,61564)(32633,61566)(32647,61568)(32653,61570)
(32687,61571)(32693,61573)(32707,61575)(32713,61577)(32717,61579)
(32719,61581)(32749,61582)(32771,61584)(32779,61586)(32783,61588)
(32789,61590)(32797,61591)(32801,61593)(32803,61595)(32831,61597)
(32833,61599)(32839,61600)(32843,61602)(32869,61604)(32887,61606)
(32909,61608)(32911,61610)(32917,61611)(32933,61613)(32939,61615)
(32941,61617)(32957,61619)(32969,61620)(32971,61622)(32983,61624)
(32987,61626)(32993,61628)(32999,61629)(33013,61631)(33023,61633)
(33029,61635)(33037,61637)(33049,61638)(33053,61640)(33071,61642)
(33073,61644)(33083,61646)(33091,61647)(33107,61649)(33113,61651)
(33119,61653)(33149,61655)(33151,61656)(33161,61658)(33179,61660)
(33181,61662)(33191,61664)(33199,61665)(33203,61667)(33211,61669)
(33223,61671)(33247,61673)(33287,61674)(33289,61676)(33301,61678)
(33311,61680)(33317,61681)(33329,61683)(33331,61685)(33343,61687)
(33347,61689)(33349,61690)(33353,61692)(33359,61694)(33377,61696)
(33391,61697)(33403,61699)(33409,61701)(33413,61703)(33427,61705)
(33457,61706)(33461,61708)(33469,61710)(33479,61712)(33487,61714)
(33493,61715)(33503,61717)(33521,61719)(33529,61721)(33533,61722)
(33547,61724)(33563,61726)(33569,61728)(33577,61729)(33581,61731)
(33587,61733)(33589,61735)(33599,61737)(33601,61738)(33613,61740)
(33617,61742)(33619,61744)(33623,61745)(33629,61747)(33637,61749)
(33641,61751)(33647,61752)(33679,61754)(33703,61756)(33713,61758)
(33721,61760)(33739,61761)(33749,61763)(33751,61765)(33757,61767)
(33767,61768)(33769,61770)(33773,61772)(33791,61774)(33797,61775)
(33809,61777)(33811,61779)(33827,61781)(33829,61782)(33851,61784)
(33857,61786)(33863,61788)(33871,61789)(33889,61791)(33893,61793)
(33911,61795)(33923,61797)(33931,61798)(33937,61800)(33941,61802)
(33961,61804)(33967,61805)(33997,61807)(34019,61809)(34031,61811)
(34033,61812)(34039,61814)(34057,61816)(34061,61818)(34123,61819)
(34127,61821)(34129,61823)(34141,61824)(34147,61826)(34157,61828)
(34159,61830)(34171,61831)(34183,61833)(34211,61835)(34213,61837)
(34217,61838)(34231,61840)(34253,61842)(34259,61844)(34261,61845)
(34267,61847)(34273,61849)(34283,61851)(34297,61852)(34301,61854)
(34303,61856)(34313,61858)(34319,61859)(34327,61861)(34337,61863)
(34351,61864)(34361,61866)(34367,61868)(34369,61870)(34381,61871)
(34403,61873)(34421,61875)(34429,61877)(34439,61878)(34457,61880)
(34469,61882)(34471,61883)(34483,61885)(34487,61887)(34499,61889)
(34501,61890)(34511,61892)(34513,61894)(34519,61896)(34537,61897)
(34543,61899)(34549,61901)(34583,61902)(34589,61904)(34591,61906)
(34603,61908)(34607,61909)(34613,61911)(34631,61913)(34649,61914)
(34651,61916)(34667,61918)(34673,61920)(34679,61921)(34687,61923)
(34693,61925)(34703,61926)(34721,61928)(34729,61930)(34739,61932)
(34747,61933)(34757,61935)(34759,61937)(34763,61938)(34781,61940)
(34807,61942)(34819,61944)(34841,61945)(34843,61947)(34847,61949)
(34849,61950)(34871,61952)(34877,61954)(34883,61956)(34897,61957)
(34913,61959)(34919,61961)(34939,61962)(34949,61964)(34961,61966)
(34963,61967)(34981,61969)(35023,61971)(35027,61973)(35051,61974)
(35053,61976)(35059,61978)(35069,61979)(35081,61981)(35083,61983)
(35089,61984)(35099,61986)(35107,61988)(35111,61990)(35117,61991)
(35129,61993)(35141,61995)(35149,61996)(35153,61998)(35159,62000)
(35171,62001)(35201,62003)(35221,62005)(35227,62006)(35251,62008)
(35257,62010)(35267,62012)(35279,62013)(35281,62015)(35291,62017)
(35311,62018)(35317,62020)(35323,62022)(35327,62023)(35339,62025)
(35353,62027)(35363,62028)(35381,62030)(35393,62032)(35401,62033)
(35407,62035)(35419,62037)(35423,62038)(35437,62040)(35447,62042)
(35449,62043)(35461,62045)(35491,62047)(35507,62049)(35509,62050)
(35521,62052)(35527,62054)(35531,62055)(35533,62057)(35537,62059)
(35543,62060)(35569,62062)(35573,62064)(35591,62065)(35593,62067)

TABLE 1-continued (35597,62069)(35603,62070)(35617,62072)(35671,62074)(35677,62075)
(35729,62077)(35731,62079)(35747,62080)(35753,62082)(35759,62084)
(35771,62085)(35797,62087)(35801,62089)(35803,62090)(35809,62092)
(35831,62094)(35837,62095)(35839,62097)(35851,62099)(35863,62100)
(35869,62102)(35879,62104)(35897,62105)(35899,62107)(35911,62108)
(35923,62110)(35933,62112)(35951,62113)(35963,62115)(35969,62117)
(35977,62118)(35983,62120)(35993,62122)(35999,62123)(36007,62125)
(36011,62127)(36013,62128)(36017,62130)(36037,62132)(36061,62133)
(36067,62135)(36073,62137)(36083,62138)(36097,62140)(36107,62142)
(36109,62143)(36131,62145)(36137,62146)(36151,62148)(36161,62150)
(36187,62151)(36191,62153)(36209,62155)(36217,62156)(36229,62158)
(36241,62160)(36251,62161)(36263,62163)(36269,62165)(36277,62166)
(36293,62168)(36299,62169)(36307,62171)(36313,62173)(36319,62174)
(36341,62176)(36343,62178)(36353,62179)(36373,62181)(36383,62183)
(36389,62184)(36433,62186)(36451,62187)(36457,62189)(36467,62191)
(36469,62192)(36473,62194)(36479,62196)(36493,62197)(36497,62199)
(36523,62201)(36527,62202)(36529,62204)(36541,62205)(36551,62207)
(36559,62209)(36563,62210)(36571,62212)(36583,62214)(36587,62215)
(36599,62217)(36607,62218)(36629,62220)(36637,62222)(36643,62223)
(36653,62225)(36671,62227)(36677,62228)(36683,62230)(36691,62231)
(36697,62233)(36709,62235)(36713,62236)(36721,62238)(36739,62240)
(36749,62241)(36761,62243)(36767,62244)(36779,62246)(36781,62248)
(36787,62249)(36791,62251)(36793,62252)(36809,62254)(36821,62256)
(36833,62257)(36847,62259)(36857,62261)(36871,62262)(36877,62264)
(36887,62265)(36899,62267)(36901,62269)(36913,62270)(36919,62272)
(36923,62273)(36929,62275)(36931,62277)(36943,62278)(36947,62280)
(36973,62281)(36979,62283)(36997,62285)(37003,62286)(37013,62288)
(37019,62290)(37021,62291)(37039,62293)(37049,62294)(37057,62296)
(37061,62298)(37087,62299)(37097,62301)(37117,62302)(37123,62304)
(37139,62306)(37159,62307)(37171,62309)(37181,62310)(37189,62312)
(37199,62314)(37201,62315)(37217,62317)(37223,62318)(37243,62320)
(37253,62322)(37273,62323)(37277,62325)(37307,62326)(37309,62328)
(37313,62330)(37321,62331)(37337,62333)(37339,62334)(37357,62336)
(37361,62338)(37363,62339)(37369,62341)(37379,62342)(37397,62344)
(37409,62345)(37423,62347)(37441,62349)(37447,62350)(37463,62352)
(37483,62353)(37489,62355)(37493,62357)(37501,62358)(37507,62360)
(37511,62361)(37517,62363)(37529,62365)(37537,62366)(37547,62368)
(37549,62369)(37561,62371)(37567,62372)(37571,62374)(37573,62376)
(37579,62377)(37589,62379)(37591,62380)(37607,62382)(37619,62384)
(37633,62385)(37643,62387)(37649,62388)(37657,62390)(37663,62391)
(37691,62393)(37693,62395)(37699,62396)(37717,62398)(37747,62399)
(37781,62401)(37783,62402)(37799,62404)(37811,62406)(37813,62407)
(37831,62409)(37847,62410)(37853,62412)(37861,62413)(37871,62415)
(37879,62417)(37889,62418)(37897,62420)(37907,62421)(37951,62423)
(37957,62424)(37963,62426)(37967,62428)(37987,62429)(37991,62431)
(37993,62432)(37997,62434)(38011,62435)(38039,62437)(38047,62439)
(38053,62440)(38069,62442)(38083,62443)(38113,62445)(38119,62446)
(38149,62448)(38153,62450)(38167,62451)(38177,62453)(38183,62454)
(38189,62456)(38197,62457)(38201,62459)(38219,62460)(38231,62462)
(38237,62464)(38239,62465)(38261,62467)(38273,62468)(38281,62470)
(38287,62471)(38299,62473)(38303,62474)(38317,62476)(38321,62478)
(38327,62479)(38329,62481)(38333,62482)(38351,62484)(38371,62485)
(38377,62487)(38393,62488)(38431,62490)(38447,62491)(38449,62493)
(38453,62495)(38459,62496)(38461,62498)(38501,62499)(38543,62501)
(38557,62502)(38561,62504)(38567,62505)(38569,62507)(38593,62508)
(38603,62510)(38609,62512)(38611,62513)(38629,62515)(38639,62516)
(38651,62518)(38653,62519)(38669,62521)(38671,62522)(38677,62524)
(38693,62525)(38699,62527)(38707,62528)(38711,62530)(38713,62532)
(38723,62533)(38729,62535)(38737,62536)(38747,62538)(38749,62539)
(38767,62541)(38783,62542)(38791,62544)(38803,62545)(38821,62547)
(38833,62548)(38839,62550)(38851,62552)(38861,62553)(38867,62555)
(38873,62556)(38891,62558)(38903,62559)(38917,62561)(38921,62562)
(38923,62564)(38933,62565)(38953,62567)(38959,62568)(38971,62570)
(38977,62571)(38993,62573)(39019,62574)(39023,62576)(39041,62577)
(39043,62579)(39047,62581)(39079,62582)(39089,62584)(39097,62585)
(39103,62587)(39107,62588)(39113,62590)(39119,62591)(39133,62593)
(39139,62594)(39157,62596)(39161,62597)(39163,62599)(39181,62600)
(39191,62602)(39199,62603)(39209,62605)(39217,62606)(39227,62608)
(39229,62609)(39233,62611)(39239,62612)(39241,62614)(39251,62615)
(39293,62617)(39301,62618)(39313,62620)(39317,62622)(39323,62623)
(39341,62625)(39343,62626)(39359,62628)(39367,62629)(39371,62631)
(39373,62632)(39383,62634)(39397,62635)(39409,62637)(39419,62638)
(39439,62640)(39443,62641)(39451,62643)(39461,62644)(39499,62646)
(39503,62647)(39509,62649)(39511,62650)(39521,62652)(39541,62653)
(39551,62655)(39563,62656)(39569,62658)(39581,62659)(39607,62661)
(39619,62662)(39623,62664)(39631,62665)(39659,62667)(39667,62668)
(39671,62670)(39679,62671)(39703,62673)(39709,62674)(39719,62676)
(39727,62677)(39733,62679)(39749,62680)(39761,62682)(39769,62683)
(39779,62685)(39791,62686)(39799,62688)(39821,62689)(39827,62691)
(39829,62692)(39839,62694)(39841,62695)(39847,62697)(39857,62698)
(39863,62700)(39869,62701)(39877,62703)(39883,62704)(39887,62706)
(39901,62707)(39929,62709)(39937,62710)(39953,62712)(39971,62713)
(39979,62715)(39983,62716)(39989,62718)(40009,62719)(40013,62721)
(40031,62722)(40037,62723)(40039,62725)(40063,62726)(40087,62728)
(40093,62729)(40099,62731)(40111,62732)(40123,62734)(40127,62735)
(40129,62737)(40151,62738)(40153,62740)(40163,62741)(40169,62743)
(40177,62744)(40189,62746)(40193,62747)(40213,62749)(40231,62750)
(40237,62752)(40241,62753)(40253,62755)(40277,62756)(40283,62758)
(40289,62759)(40343,62761)(40351,62762)(40357,62763)(40361,62765)
(40387,62766)(40423,62768)(40427,62769)(40429,62771)(40433,62772)
(40459,62774)(40471,62775)(40483,62777)(40487,62778)(40493,62780)
(40499,62781)(40507,62783)(40519,62784)(40529,62786)(40531,62787)
(40543,62788)(40559,62790)(40577,62791)(40583,62793)(40591,62794)
(40597,62796)(40609,62797)(40627,62799)(40637,62800)(40639,62802)
(40693,62803)(40697,62805)(40699,62806)(40709,62808)(40739,62809)
(40751,62810)(40759,62812)(40763,62813)(40771,62815)(40787,62816)
(40801,62818)(40813,62819)(40819,62821)(40823,62822)(40829,62824)
(40841,62825)(40847,62826)(40849,62828)(40853,62829)(40867,62831)
(40879,62832)(40883,62834)(40897,62835)(40903,62837)(40927,62838)
(40933,62840)(40939,62841)(40949,62842)(40961,62844)(40973,62845)
(40993,62847)(41011,62848)(41017,62850)(41023,62851)(41039,62853)
(41047,62854)(41051,62856)(41057,62857)(41077,62858)(41081,62860)
(41113,62861)(41117,62863)(41131,62864)(41141,62866)(41143,62867)
(41149,62869)(41161,62870)(41177,62871)(41179,62873)(41183,62874)
(41189,62876)(41201,62877)(41203,62879)(41213,62880)(41221,62882)
(41227,62883)(41231,62884)(41233,62886)(41243,62887)(41257,62889)
(41263,62890)(41269,62892)(41281,62893)(41299,62895)(41333,62896)
(41341,62897)(41351,62899)(41357,62900)(41381,62902)(41387,62903)
(41389,62905)(41399,62906)(41411,62907)(41413,62909)(41443,62910)
(41453,62912)(41467,62913)(41479,62915)(41491,62916)(41507,62918)
(41513,62919)(41519,62920)(41521,62922)(41539,62923)(41543,62925)
(41549,62926)(41579,62928)(41593,62929)(41597,62930)(41603,62932)
(41609,62933)(41611,62935)(41617,62936)(41621,62938)(41627,62939)
(41641,62940)(41647,62942)(41651,62943)(41659,62945)(41669,62946)
(41681,62948)(41687,62949)(41719,62950)(41729,62952)(41737,62953)
(41759,62955)(41761,62956)(41771,62958)(41777,62959)(41801,62960)
(41809,62962)(41813,62963)(41843,62965)(41849,62966)(41851,62968)
(41863,62969)(41879,62970)(41887,62972)(41893,62973)(41897,62975)
(41903,62976)(41911,62977)(41927,62979)(41941,62980)(41947,62982)
(41953,62983)(41957,62985)(41959,62986)(41969,62987)(41981,62989)
(41983,62990)(41999,62992)(42013,62993)(42017,62994)(42019,62996)
(42023,62997)(42043,62999)(42061,63000)(42071,63002)(42073,63003)
(42083,63004)(42089,63006)(42101,63007)(42131,63009)(42139,63010)
(42157,63011)(42169,63013)(42179,63014)(42181,63016)(42187,63017)
(42193,63018)(42197,63020)(42209,63021)(42221,63023)(42223,63024)
(42227,63026)(42239,63027)(42257,63028)(42281,63030)(42283,63031)
(42293,63033)(42299,63034)(42307,63035)(42323,63037)(42331,63038)
(42337,63040)(42349,63041)(42359,63042)(42373,63044)(42379,63045)
(42391,63047)(42397,63048)(42403,63049)(42407,63051)(42409,63052)
(42433,63054)(42437,63055)(42443,63056)(42451,63058)(42457,63059)
(42461,63061)(42463,63062)(42467,63063)(42473,63065)(42487,63066)
(42491,63068)(42499,63069)(42509,63070)(42533,63072)(42557,63073)
(42569,63075)(42571,63076)(42577,63077)(42589,63079)(42611,63080)
(42641,63082)(42643,63083)(42649,63084)(42667,63086)(42677,63087)
(42683,63089)(42689,63090)(42697,63091)(42701,63093)(42703,63094)
(42709,63096)(42719,63097)(42727,63098)(42737,63100)(42743,63101)
(42751,63103)(42767,63104)(42773,63105)(42787,63107)(42793,63108)
(42797,63109)(42821,63111)(42829,63112)(42839,63114)(42841,63115)
(42853,63116)(42859,63118)(42863,63119)(42899,63121)(42901,63122)
(42923,63123)(42929,63125)(42937,63126)(42943,63128)(42953,63129)
(42961,63130)(42977,63132)(42979,63133)(42989,63134)(43003,63136)
(43013,63137)(43019,63139)(43037,63140)(43049,63141)(43051,63143)
(43063,63144)(43067,63146)(43093,63147)(43103,63148)(43117,63150)
(43133,63151)(43151,63152)(43159,63154)(43177,63155)(43189,63157)
(43201,63158)(43207,63159)(43223,63161)(43237,63162)(43261,63163)
(43271,63165)(43283,63166)(43291,63168)(43313,63169)(43319,63170)
(43321,63172)(43331,63173)(43391,63174)(43397,63176)(43399,63177)
(43403,63179)(43411,63180)(43427,63181)(43441,63183)(43451,63184)
(43457,63185)(43481,63187)(43487,63188)(43499,63190)(43517,63191)
(43541,63192)(43543,63194)(43573,63195)(43577,63196)(43579,63198)
(43591,63199)(43597,63200)(43607,63202)(43609,63203)(43613,63205)
(43627,63206)(43633,63207)(43649,63209)(43651,63210)(43661,63211)
(43669,63213)(43691,63214)(43711,63215)(43717,63217)(43721,63218)
(43753,63220)(43759,63221)(43777,63222)(43781,63224)(43783,63225)
(43787,63226)(43789,63228)(43793,63229)(43801,63230)(43853,63232)
(43867,63233)(43889,63234)(43891,63236)(43913,63237)(43933,63239)
(43943,63240)(43951,63241)(43961,63243)(43963,63244)(43969,63245)
(43973,63247)(43987,63248)(43991,63249)(43997,63251)(44017,63252)

TABLE 1-continued (44021,63253)(44027,63255)(44029,63256)(44041,63257)(44053,63259)
(44059,63260)(44071,63262)(44087,63263)(44089,63264)(44101,63266)
(44111,63267)(44119,63268)(44123,63270)(44129,63271)(44131,63272)
(44159,63274)(44171,63275)(44179,63276)(44189,63278)(44201,63279)
(44203,63280)(44207,63282)(44221,63283)(44249,63284)(44257,63286)
(44263,63287)(44267,63288)(44269,63290)(44273,63291)(44279,63292)
(44281,63294)(44293,63295)(44351,63297)(44357,63298)(44371,63299)
(44381,63301)(44383,63302)(44389,63303)(44417,63305)(44449,63306)
(44453,63307)(44483,63309)(44491,63310)(44497,63311)(44501,63313)
(44507,63314)(44519,63315)(44531,63317)(44533,63318)(44537,63319)
(44543,63321)(44549,63322)(44563,63323)(44579,63325)(44587,63326)
(44617,63327)(44621,63329)(44623,63330)(44633,63331)(44641,63333)
(44647,63334)(44651,63335)(44657,63337)(44683,63338)(44687,63339)
(44699,63341)(44701,63342)(44711,63343)(44729,63345)(44741,63346)
(44753,63347)(44771,63349)(44773,63350)(44777,63351)(44789,63353)
(44797,63354)(44809,63355)(44819,63357)(44839,63358)(44843,63359)
(44851,63361)(44867,63362)(44879,63363)(44887,63365)(44893,63366)
(44909,63367)(44917,63368)(44927,63370)(44939,63371)(44953,63372)
(44959,63374)(44963,63375)(44971,63376)(44983,63378)(44987,63379)
(45007,63380)(45013,63382)(45053,63383)(45061,63384)(45077,63386)
(45083,63387)(45119,63388)(45121,63390)(45127,63391)(45131,63392)
(45137,63394)(45139,63395)(45161,63396)(45179,63398)(45181,63399)
(45191,63400)(45197,63401)(45233,63403)(45247,63404)(45259,63405)
(45263,63407)(45281,63408)(45289,63409)(45293,63411)(45307,63412)
(45317,63413)(45319,63415)(45329,63416)(45337,63417)(45341,63419)
(45343,63420)(45361,63421)(45377,63423)(45389,63424)(45403,63425)
(45413,63426)(45427,63428)(45433,63429)(45439,63430)(45481,63432)
(45491,63433)(45497,63434)(45503,63436)(45523,63437)(45533,63438)
(45541,63440)(45553,63441)(45557,63442)(45569,63443)(45587,63445)
(45589,63446)(45599,63447)(45613,63449)(45631,63450)(45641,63451)
(45659,63453)(45667,63454)(45673,63455)(45677,63456)(45691,63458)
(45697,63459)(45707,63460)(45737,63462)(45751,63463)(45757,63464)
(45763,63466)(45767,63467)(45779,63468)(45817,63469)(45821,63471)
(45823,63472)(45827,63473)(45833,63475)(45841,63476)(45853,63477)
(45863,63479)(45869,63480)(45887,63481)(45893,63482)(45943,63484)
(45949,63485)(45953,63486)(45959,63488)(45971,63489)(45979,63490)
(45989,63492)(46021,63493)(46027,63494)(46049,63495)(46051,63497)
(46061,63498)(46073,63499)(46091,63501)(46093,63502)(46099,63503)
(46103,63504)(46133,63506)(46141,63507)(46147,63508)(46153,63510)
(46171,63511)(46181,63512)(46183,63513)(46187,63515)(46199,63516)
(46219,63517)(46229,63519)(46237,63520)(46261,63521)(46271,63522)
(46273,63524)(46279,63525)(46301,63526)(46307,63528)(46309,63529)
(46327,63530)(46337,63531)(46349,63533)(46351,63534)(46381,63535)
(46399,63537)(46411,63538)(46439,63539)(46441,63540)(46447,63542)
(46451,63543)(46457,63544)(46471,63546)(46477,63547)(46489,63548)
(46499,63549)(46507,63551)(46511,63552)(46523,63553)(46549,63555)
(46559,63556)(46567,63557)(46573,63558)(46589,63560)(46591,63561)
(46601,63562)(46619,63563)(46633,63565)(46639,63566)(46643,63567)
(46649,63569)(46663,63570)(46679,63571)(46681,63572)(46687,63574)
(46691,63575)(46703,63576)(46723,63578)(46727,63579)(46747,63580)
(46751,63581)(46757,63583)(46769,63584)(46771,63585)(46807,63586)
(46811,63588)(46817,63589)(46819,63590)(46829,63591)(46831,63593)
(46853,63594)(46861,63595)(46867,63597)(46877,63598)(46889,63599)
(46901,63600)(46919,63602)(46933,63603)(46957,63604)(46993,63605)
(46997,63607)(47017,63608)(47041,63609)(47051,63611)(47057,63612)
(47059,63613)(47087,63614)(47093,63616)(47111,63617)(47119,63618)
(47123,63619)(47129,63621)(47137,63622)(47143,63623)(47147,63624)
(47149,63626)(47161,63627)(47189,63628)(47207,63629)(47221,63631)
(47237,63632)(47251,63633)(47269,63634)(47279,63636)(47287,63637)
(47293,63638)(47297,63640)(47303,63641)(47309,63642)(47317,63643)
(47339,63645)(47351,63646)(47353,63647)(47363,63648)(47381,63650)
(47387,63651)(47389,63652)(47407,63653)(47417,63655)(47419,63656)
(47431,63657)(47441,63658)(47459,63660)(47491,63661)(47497,63662)
(47501,63663)(47507,63665)(47513,63666)(47521,63667)(47527,63668)
(47533,63670)(47543,63671)(47563,63672)(47569,63673)(47581,63675)
(47591,63676)(47599,63677)(47609,63678)(47623,63680)(47629,63681)
(47639,63682)(47653,63683)(47657,63685)(47659,63686)(47681,63687)
(47699,63688)(47701,63690)(47711,63691)(47713,63692)(47717,63693)
(47737,63695)(47741,63696)(47743,63697)(47777,63698)(47779,63700)
(47791,63701)(47797,63702)(47807,63703)(47809,63705)(47819,63706)
(47837,63707)(47843,63708)(47857,63710)(47869,63711)(47881,63712)
(47903,63713)(47911,63715)(47917,63716)(47933,63717)(47939,63718)
(47947,63719)(47951,63721)(47963,63722)(47969,63723)(47977,63724)
(47981,63726)(48017,63727)(48023,63728)(48029,63729)(48049,63731)
(48073,63732)(48079,63733)(48091,63734)(48109,63736)(48119,63737)
(48121,63738)(48131,63739)(48157,63741)(48163,63742)(48179,63743)
(48187,63744)(48193,63745)(48197,63747)(48221,63748)(48239,63749)
(48247,63750)(48259,63752)(48271,63753)(48281,63754)(48299,63755)
(48311,63757)(48313,63758)(48337,63759)(48341,63760)(48353,63762)
(48371,63763)(48383,63764)(48397,63765)(48407,63766)(48409,63768)
(48413,63769)(48437,63770)(48449,63771)(48463,63773)(48473,63774)
(48479,63775)(48481,63776)(48487,63777)(48491,63779)(48497,63780)
(48523,63781)(48527,63782)(48533,63784)(48539,63785)(48541,63786)
(48563,63787)(48571,63789)(48589,63790)(48593,63791)(48611,63792)
(48619,63793)(48623,63795)(48647,63796)(48649,63797)(48661,63798)
(48673,63800)(48677,63801)(48679,63802)(48731,63803)(48733,63804)
(48751,63806)(48757,63807)(48761,63808)(48767,63809)(48779,63811)
(48781,63812)(48787,63813)(48799,63814)(48809,63815)(48817,63817)
(48821,63818)(48823,63819)(48847,63820)(48857,63821)(48859,63823)
(48869,63824)(48871,63825)(48883,63826)(48889,63828)(48907,63829)
(48947,63830)(48953,63831)(48973,63832)(48989,63834)(48991,63835)
(49003,63836)(49009,63837)(49019,63839)(49031,63840)(49033,63841)
(49037,63842)(49043,63843)(49057,63845)(49069,63846)(49081,63847)
(49103,63848)(49109,63849)(49117,63851)(49121,63852)(49123,63853)
(49139,63854)(49157,63855)(49169,63857)(49171,63858)(49177,63859)
(49193,63860)(49199,63862)(49201,63863)(49207,63864)(49211,63865)
(49223,63866)(49253,63868)(49261,63869)(49277,63870)(49279,63871)
(49297,63872)(49307,63874)(49331,63875)(49333,63876)(49339,63877)
(49363,63878)(49367,63880)(49369,63881)(49391,63882)(49393,63883)
(49409,63884)(49411,63886)(49417,63887)(49429,63888)(49433,63889)
(49451,63890)(49459,63892)(49463,63893)(49477,63894)(49481,63895)
(49499,63897)(49523,63898)(49529,63899)(49531,63900)(49537,63901)
(49547,63903)(49549,63904)(49559,63905)(49597,63906)(49603,63907)
(49613,63909)(49627,63910)(49633,63911)(49639,63912)(49663,63913)
(49667,63915)(49669,63916)(49681,63917)(49697,63918)(49711,63919)
(49727,63920)(49739,63922)(49741,63923)(49747,63924)(49757,63925)
(49783,63926)(49787,63928)(49789,63929)(49801,63930)(49807,63931)
(49811,63932)(49823,63934)(49831,63935)(49843,63936)(49853,63937)
(49871,63938)(49877,63940)(49891,63941)(49919,63942)(49921,63943)
(49927,63944)(49937,63946)(49939,63947)(49943,63948)(49957,63949)
(49991,63950)(49993,63952)(49999,63953)(50021,63954)(50023,63955)
(50033,63956)(50047,63957)(50051,63959)(50053,63960)(50069,63961)
(50077,63962)(50087,63963)(50093,63965)(50101,63966)(50111,63967)
(50119,63968)(50123,63969)(50129,63971)(50131,63972)(50147,63973)
(50153,63974)(50159,63975)(50177,63976)(50207,63978)(50221,63979)
(50227,63980)(50231,63981)(50261,63982)(50263,63984)(50273,63985)
(50287,63986)(50291,63987)(50311,63988)(50321,63989)(50329,63991)
(50333,63992)(50341,63993)(50359,63994)(50363,63995)(50377,63997)
(50383,63998)(50387,63999)(50411,64000)(50417,64001)(50423,64002)
(50441,64004)(50459,64005)(50461,64006)(50497,64007)(50503,64008)
(50513,64010)(50527,64011)(50539,64012)(50543,64013)(50549,64014)
(50551,64015)(50581,64017)(50587,64018)(50591,64019)(50593,64020)
(50599,64021)(50627,64023)(50647,64024)(50651,64025)(50671,64026)
(50683,64027)(50707,64028)(50723,64030)(50741,64031)(50753,64032)
(50767,64033)(50773,64034)(50777,64035)(50789,64037)(50821,64038)
(50833,64039)(50839,64040)(50849,64041)(50857,64042)(50867,64044)
(50873,64045)(50891,64046)(50893,64047)(50909,64048)(50923,64049)
(50929,64051)(50951,64052)(50957,64053)(50969,64054)(50971,64055)
(50989,64056)(50993,64058)(51001,64059)(51031,64060)(51043,64061)
(51047,64062)(51059,64063)(51061,64065)(51071,64066)(51109,64067)
(51131,64068)(51133,64069)(51137,64070)(51151,64072)(51157,64073)
(51169,64074)(51193,64075)(51197,64076)(51199,64077)(51203,64079)
(51217,64080)(51229,64081)(51239,64082)(51241,64083)(51257,64084)
(51263,64086)(51283,64087)(51287,64088)(51307,64089)(51329,64090)
(51341,64091)(51343,64093)(51347,64094)(51349,64095)(51361,64096)
(51383,64097)(51407,64098)(51413,64099)(51419,64101)(51421,64102)
(51427,64103)(51431,64104)(51437,64105)(51439,64106)(51449,64108)
(51461,64109)(51473,64110)(51479,64111)(51481,64112)(51487,64113)
(51503,64114)(51511,64116)(51517,64117)(51521,64118)(51539,64119)
(51551,64120)(51563,64121)(51577,64123)(51581,64124)(51593,64125)
(51599,64126)(51607,64127)(51613,64128)(51631,64129)(51637,64131)
(51647,64132)(51659,64133)(51673,64134)(51679,64135)(51683,64136)
(51691,64138)(51713,64139)(51719,64140)(51721,64141)(51749,64142)
(51767,64143)(51769,64144)(51787,64146)(51797,64147)(51803,64148)
(51817,64149)(51827,64150)(51829,64151)(51839,64152)(51853,64154)
(51859,64155)(51869,64156)(51871,64157)(51893,64158)(51899,64159)
(51907,64161)(51913,64162)(51929,64163)(51941,64164)(51949,64165)
(51971,64166)(51973,64167)(51977,64169)(51991,64170)(52009,64171)
(52021,64172)(52027,64173)(52051,64174)(52057,64175)(52067,64177)
(52069,64178)(52081,64179)(52103,64180)(52121,64181)(52127,64182)
(52147,64183)(52153,64185)(52163,64186)(52177,64187)(52181,64188)
(52183,64189)(52189,64190)(52201,64191)(52223,64193)(52237,64194)
(52249,64195)(52253,64196)(52259,64197)(52267,64198)(52289,64199)
(52291,64200)(52301,64201)(52313,64203)(52321,64204)(52361,64205)
(52363,64206)(52369,64207)(52379,64208)(52387,64210)(52391,64211)
(52433,64212)(52453,64213)(52457,64214)(52489,64215)(52501,64216)
(52511,64218)(52517,64219)(52529,64220)(52541,64221)(52543,64222)
(52553,64223)(52561,64224)(52567,64225)(52571,64227)(52579,64228)

TABLE 1-continued (52583,64229)(52609,64230)(52627,64231)(52631,64232)(52639,64233)
(52667,64234)(52673,64236)(52691,64237)(52697,64238)(52709,64239)
(52711,64240)(52721,64241)(52727,64242)(52733,64244)(52747,64245)
(52757,64246)(52769,64247)(52783,64248)(52807,64249)(52813,64250)
(52817,64251)(52837,64253)(52859,64254)(52861,64255)(52879,64256)
(52883,64257)(52889,64258)(52901,64259)(52903,64260)(52919,64262)
(52937,64263)(52951,64264)(52957,64265)(52963,64266)(52967,64267)
(52973,64268)(52981,64269)(52999,64271)(53003,64272)(53017,64273)
(53047,64274)(53051,64275)(53069,64276)(53077,64277)(53087,64278)
(53089,64280)(53093,64281)(53101,64282)(53113,64283)(53117,64284)
(53129,64285)(53147,64286)(53149,64287)(53161,64288)(53171,64290)
(53173,64291)(53189,64292)(53197,64293)(53201,64294)(53231,64295)
(53233,64296)(53239,64297)(53267,64299)(53269,64300)(53279,64301)
(53281,64302)(53299,64303)(53309,64304)(53323,64305)(53327,64306)
(53353,64307)(53359,64309)(53377,64310)(53381,64311)(53401,64312)
(53407,64313)(53411,64314)(53419,64315)(53437,64316)(53441,64317)
(53453,64319)(53479,64320)(53503,64321)(53507,64322)(53527,64323)
(53549,64324)(53551,64325)(53569,64326)(53591,64327)(53593,64329)
(53597,64330)(53609,64331)(53611,64332)(53617,64333)(53623,64334)
(53629,64335)(53633,64336)(53639,64337)(53653,64339)(53657,64340)
(53681,64341)(53693,64342)(53699,64343)(53717,64344)(53719,64345)
(53731,64346)(53759,64347)(53773,64349)(53777,64350)(53783,64351)
(53791,64352)(53813,64353)(53819,64354)(53831,64355)(53849,64356)
(53857,64357)(53861,64359)(53881,64360)(53887,64361)(53891,64362)
(53897,64363)(53899,64364)(53917,64365)(53923,64366)(53927,64367)
(53939,64368)(53951,64370)(53959,64371)(53987,64372)(53993,64373)
(54001,64374)(54011,64375)(54013,64376)(54037,64377)(54049,64378)
(54059,64379)(54083,64381)(54091,64382)(54101,64383)(54111,64384)
(54133,64385)(54139,64386)(54151,64387)(54163,64388)(54167,64389)
(54181,64390)(54193,64392)(54217,64393)(54251,64394)(54269,64395)
(54277,64396)(54287,64397)(54293,64398)(54311,64399)(54319,64400)
(54323,64401)(54331,64403)(54347,64404)(54361,64405)(54367,64406)
(54371,64407)(54377,64408)(54401,64409)(54403,64410)(54409,64411)
(54413,64412)(54419,64413)(54421,64415)(54437,64416)(54443,64417)
(54449,64418)(54469,64419)(54493,64420)(54497,64421)(54499,64422)
(54503,64423)(54517,64424)(54521,64425)(54539,64427)(54541,64428)
(54547,64429)(54559,64430)(54563,64431)(54577,64432)(54581,64433)
(54583,64434)(54601,64435)(54617,64436)(54623,64437)(54629,64439)
(54631,64440)(54647,64441)(54667,64442)(54673,64443)(54679,64444)
(54709,64445)(54713,64446)(54721,64447)(54727,64448)(54751,64449)
(54767,64451)(54773,64452)(54779,64453)(54787,64454)(54799,64455)
(54829,64456)(54833,64457)(54851,64458)(54869,64459)(54877,64460)
(54881,64461)(54907,64462)(54917,64464)(54919,64465)(54941,64466)
(54949,64467)(54959,64468)(54973,64469)(54979,64470)(54983,64471)
(55001,64472)(55009,64473)(55021,64474)(55049,64475)(55051,64477)
(55057,64478)(55061,64479)(55073,64480)(55079,64481)(55103,64482)
(55109,64483)(55117,64484)(55127,64485)(55147,64486)(55163,64487)
(55171,64488)(55201,64489)(55207,64491)(55213,64492)(55217,64493)
(55219,64494)(55229,64495)(55243,64496)(55249,64497)(55259,64498)
(55291,64499)(55313,64500)(55331,64501)(55333,64502)(55337,64503)
(55339,64505)(55343,64506)(55351,64507)(55373,64508)(55381,64509)
(55399,64510)(55411,64511)(55439,64512)(55441,64513)(55457,64514)
(55469,64515)(55487,64516)(55501,64517)(55511,64519)(55529,64520)
(55541,64521)(55547,64522)(55579,64523)(55589,64524)(55603,64525)
(55609,64526)(55619,64527)(55621,64528)(55631,64529)(55633,64530)
(55639,64531)(55661,64532)(55663,64534)(55667,64535)(55673,64536)
(55681,64537)(55691,64538)(55697,64539)(55711,64540)(55717,64541)
(55721,64542)(55733,64543)(55763,64544)(55787,64545)(55793,64546)
(55799,64547)(55807,64548)(55813,64550)(55817,64551)(55819,64552)
(55823,64553)(55829,64554)(55837,64555)(55843,64556)(55849,64557)
(55871,64558)(55889,64559)(55897,64560)(55901,64561)(55903,64562)
(55921,64563)(55927,64564)(55931,64565)(55933,64567)(55949,64568)
(55967,64569)(55987,64570)(55997,64571)(56003,64572)(56009,64573)
(56039,64574)(56041,64575)(56053,64576)(56081,64577)(56087,64578)
(56093,64579)(56099,64580)(56101,64581)(56113,64582)(56123,64584)
(56131,64585)(56149,64586)(56167,64587)(56171,64588)(56179,64589)
(56197,64590)(56207,64591)(56209,64592)(56237,64593)(56239,64594)
(56249,64595)(56263,64596)(56267,64597)(56269,64598)(56299,64599)
(56311,64600)(56333,64602)(56359,64603)(56369,64604)(56377,64605)
(56383,64606)(56393,64607)(56401,64608)(56417,64609)(56431,64610)
(56437,64611)(56443,64612)(56453,64613)(56467,64614)(56473,64615)
(56477,64616)(56479,64617)(56489,64618)(56501,64619)(56503,64621)
(56509,64622)(56519,64623)(56527,64624)(56531,64625)(56533,64626)
(56543,64627)(56569,64628)(56591,64629)(56597,64630)(56599,64631)
(56611,64632)(56629,64633)(56633,64634)(56659,64635)(56663,64636)
(56671,64637)(56681,64638)(56687,64639)(56701,64640)(56711,64642)
(56713,64643)(56731,64644)(56737,64645)(56747,64646)(56767,64647)
(56773,64648)(56779,64649)(56783,64650)(56807,64651)(56809,64652)
(56813,64653)(56821,64654)(56827,64655)(56843,64656)(56857,64657)
(56873,64658)(56891,64659)(56893,64660)(56897,64661)(56909,64662)
(56911,64664)(56921,64665)(56923,64666)(56929,64667)(56941,64668)
(56951,64669)(56957,64670)(56963,64671)(56983,64672)(56989,64673)
(56993,64674)(56999,64675)(57037,64676)(57041,64677)(57047,64678)
(57059,64679)(57073,64680)(57077,64681)(57089,64682)(57097,64683)
(57107,64684)(57119,64685)(57131,64686)(57139,64688)(57143,64689)
(57149,64690)(57163,64691)(57173,64692)(57179,64693)(57191,64694)
(57193,64695)(57203,64696)(57221,64697)(57223,64698)(57241,64699)
(57251,64700)(57259,64701)(57269,64702)(57271,64703)(57283,64704)
(57287,64705)(57301,64706)(57329,64707)(57331,64708)(57347,64709)
(57349,64710)(57367,64711)(57373,64712)(57383,64714)(57389,64715)
(57397,64716)(57413,64717)(57427,64718)(57457,64719)(57467,64720)
(57487,64721)(57493,64722)(57503,64723)(57527,64724)(57529,64725)
(57557,64726)(57559,64727)(57571,64728)(57587,64729)(57593,64730)
(57601,64731)(57637,64732)(57641,64733)(57649,64734)(57653,64735)
(57667,64736)(57679,64737)(57689,64738)(57697,64739)(57709,64740)
(57713,64741)(57719,64742)(57727,64743)(57731,64745)(57737,64746)
(57751,64747)(57773,64748)(57781,64749)(57787,64750)(57791,64751)
(57793,64752)(57803,64753)(57809,64754)(57829,64755)(57839,64756)
(57847,64757)(57853,64758)(57859,64759)(57881,64760)(57899,64761)
(57901,64762)(57917,64763)(57923,64764)(57943,64765)(57947,64766)
(57973,64767)(57977,64768)(57991,64769)(58013,64770)(58027,64771)
(58031,64772)(58043,64773)(58049,64774)(58057,64775)(58061,64776)
(58067,64777)(58073,64778)(58099,64779)(58109,64780)(58111,64782)
(58129,64783)(58147,64784)(58151,64785)(58153,64786)(58169,64787)
(58171,64788)(58189,64789)(58193,64790)(58199,64791)(58207,64792)
(58211,64793)(58217,64794)(58229,64795)(58231,64796)(58237,64797)
(58243,64798)(58271,64799)(58309,64800)(58313,64801)(58321,64802)
(58337,64803)(58363,64804)(58367,64805)(58369,64806)(58379,64807)
(58391,64808)(58393,64809)(58403,64810)(58411,64811)(58417,64812)
(58427,64813)(58439,64814)(58441,64815)(58451,64816)(58453,64817)
(58477,64818)(58481,64819)(58511,64820)(58537,64821)(58543,64822)
(58549,64823)(58567,64824)(58573,64825)(58579,64826)(58601,64827)
(58603,64828)(58613,64829)(58631,64830)(58657,64831)(58661,64832)
(58679,64833)(58687,64834)(58693,64836)(58699,64837)(58711,64838)
(58727,64839)(58733,64840)(58741,64841)(58757,64842)(58763,64843)
(58771,64844)(58787,64845)(58789,64846)(58831,64847)(58889,64848)
(58897,64849)(58901,64850)(58907,64851)(58909,64852)(58913,64853)
(58921,64854)(58937,64855)(58943,64856)(58963,64857)(58967,64858)
(58979,64859)(58991,64860)(58997,64861)(59009,64862)(59011,64863)
(59021,64864)(59023,64865)(59029,64866)(59051,64867)(59053,64868)
(59063,64869)(59069,64870)(59077,64871)(59083,64872)(59093,64873)
(59107,64874)(59113,64875)(59119,64876)(59123,64877)(59141,64878)
(59149,64879)(59159,64880)(59167,64881)(59183,64882)(59197,64883)
(59207,64884)(59209,64885)(59219,64886)(59221,64887)(59233,64888)
(59239,64889)(59243,64890)(59263,64891)(59273,64892)(59281,64893)
(59333,64894)(59341,64895)(59351,64896)(59357,64897)(59359,64898)
(59369,64899)(59377,64900)(59387,64901)(59393,64902)(59399,64903)
(59407,64904)(59417,64905)(59419,64906)(59441,64907)(59443,64908)
(59447,64909)(59453,64910)(59467,64911)(59471,64912)(59473,64913)
(59497,64914)(59509,64915)(59513,64916)(59539,64917)(59557,64918)
(59561,64919)(59567,64920)(59581,64921)(59611,64922)(59617,64923)
(59621,64924)(59627,64925)(59629,64926)(59651,64927)(59659,64928)
(59663,64929)(59669,64930)(59671,64931)(59693,64932)(59699,64933)
(59707,64934)(59723,64935)(59729,64936)(59743,64937)(59747,64938)
(59753,64939)(59771,64940)(59779,64941)(59791,64942)(59797,64943)
(59809,64944)(59833,64945)(59863,64946)(59879,64947)(59887,64948)
(59921,64949)(59929,64950)(59951,64951)(59957,64952)(59971,64953)
(59981,64954)(59999,64955)(60013,64956)(60017,64957)(60029,64958)
(60037,64959)(60041,64960)(60077,64961)(60083,64962)(60089,64963)
(60091,64964)(60101,64965)(60103,64966)(60107,64967)(60127,64968)
(60133,64969)(60139,64970)(60149,64971)(60161,64972)(60167,64973)
(60169,64974)(60209,64975)(60217,64976)(60223,64977)(60251,64978)
(60257,64979)(60259,64980)(60271,64981)(60289,64982)(60293,64983)
(60317,64984)(60331,64985)(60337,64986)(60343,64987)(60353,64988)
(60373,64989)(60383,64990)(60397,64991)(60413,64992)(60427,64993)
(60443,64994)(60449,64995)(60457,64996)(60493,64997)(60497,64998)
(60509,64999)(60521,65000)(60527,65001)(60539,65002)(60589,65003)
(60601,65004)(60607,65005)(60611,65006)(60617,65007)(60623,65008)
(60631,65009)(60637,65010)(60647,65011)(60649,65012)(60659,65013)
(60661,65014)(60679,65015)(60689,65016)(60703,65017)(60719,65018)
(60727,65019)(60733,65020)(60737,65021)(60757,65022)(60761,65023)
(60763,65024)(60773,65025)(60779,65026)(60793,65027)(60811,65028)
(60821,65029)(60859,65030)(60869,65031)(60887,65032)(60889,65033)
(60899,65034)(60901,65035)(60913,65036)(60917,65037)(60919,65038)
(60923,65039)(60937,65040)(60943,65041)(60953,65042)(60961,65043)
(61001,65044)(61007,65045)(61027,65046)(61031,65047)(61043,65048)
(61051,65049)(61057,65050)(61091,65051)(61099,65052)(61121,65053)
(61129,65054)(61141,65055)(61151,65056)(61153,65057)(61169,65058)

TABLE 1-continued (61211,65059)(61223,65060)(61231,65061)(61253,65062)(61261,65063)
(61283,65064)(61291,65065)(61297,65066)(61331,65067)(61333,65068)
(61339,65069)(61343,65070)(61357,65071)(61363,65072)(61379,65073)
(61381,65074)(61403,65075)(61409,65076)(61417,65077)(61441,65078)
(61463,65079)(61469,65080)(61471,65081)(61483,65082)(61487,65083)
(61493,65084)(61507,65085)(61511,65086)(61519,65087)(61543,65088)
(61547,65089)(61553,65090)(61559,65091)(61561,65092)(61583,65093)
(61603,65094)(61609,65095)(61613,65096)(61627,65097)(61631,65098)
(61637,65099)(61643,65100)(61651,65101)(61657,65102)(61667,65103)
(61673,65104)(61681,65105)(61687,65106)(61703,65107)(61717,65108)
(61723,65109)(61729,65110)(61751,65111)(61757,65112)(61781,65113)
(61813,65114)(61819,65115)(61837,65116)(61843,65117)(61861,65118)
(61871,65119)(61879,65120)(61909,65121)(61927,65122)(61933,65123)
(61949,65124)(61961,65125)(61967,65126)(61979,65127)(61981,65128)
(61987,65129)(61991,65130)(62003,65131)(62011,65132)(62017,65133)
(62039,65134)(62047,65135)(62053,65136)(62057,65137)(62071,65138)
(62081,65139)(62099,65140)(62119,65141)(62129,65142)(62131,65143)
(62137,65144)(62141,65145)(62143,65146)(62171,65147)(62189,65148)
(62191,65149)(62201,65150)(62207,65151)(62213,65152)(62219,65153)
(62233,65154)(62273,65155)(62297,65156)(62299,65157)(62303,65158)
(62311,65159)(62323,65160)(62327,65161)(62347,65162)(62351,65163)
(62383,65164)(62401,65165)(62417,65166)(62423,65167)(62459,65168)
(62467,65169)(62473,65170)(62477,65171)(62483,65172)(62497,65173)
(62501,65174)(62507,65175)(62533,65176)(62539,65177)(62549,65178)
(62563,65179)(62581,65180)(62591,65181)(62597,65182)(62603,65183)
(62617,65184)(62627,65185)(62633,65186)(62639,65187)(62653,65188)
(62659,65189)(62683,65190)(62687,65191)(62701,65192)(62723,65193)
(62731,65194)(62743,65195)(62753,65196)(62761,65197)(62773,65198)
(62791,65199)(62801,65200)(62819,65201)(62827,65202)(62851,65203)
(62861,65204)(62869,65205)(62873,65206)(62897,65207)(62903,65208)
(62921,65209)(62927,65210)(62929,65211)(62939,65212)(62969,65213)
(62971,65214)(62981,65215)(62983,65216)(62987,65217)(62989,65218)
(63029,65219)(63031,65220)(63059,65221)(63067,65222)(63073,65223)
(63079,65224)(63097,65225)(63103,65226)(63113,65227)(63127,65228)
(63131,65229)(63149,65230)(63179,65231)(63197,65232)(63199,65233)
(63211,65234)(63241,65235)(63247,65236)(63277,65237)(63281,65238)
(63299,65239)(63311,65240)(63313,65241)(63317,65242)(63331,65243)
(63337,65244)(63347,65245)(63353,65246)(63361,65247)(63367,65248)
(63377,65249)(63389,65250)(63391,65251)(63397,65252)(63409,65253)
(63419,65254)(63421,65255)(63439,65256)(63443,65257)(63463,65258)
(63467,65259)(63473,65260)(63487,65261)(63493,65262)(63499,65263)
(63521,65264)(63527,65265)(63533,65266)(63541,65267)(63559,65268)
(63577,65269)(63587,65270)(63589,65271)(63599,65272)(63601,65273)
(63607,65274)(63611,65275)(63617,65276)(63629,65277)(63647,65278)
(63649,65279)(63659,65280)(63667,65281)(63671,65282)(63689,65283)
(63691,65284)(63697,65285)(63703,65286)(63709,65287)(63719,65288)
(63727,65289)(63737,65290)(63743,65291)(63761,65292)(63773,65293)
(63781,65294)(63793,65295)(63799,65296)(63803,65297)(63809,65298)
(63823,65299)(63839,65300)(63841,65301)(63853,65302)(63857,65303)
(63863,65304)(63901,65305)(63907,65306)(63913,65307)(63929,65308)
(63949,65309)(63977,65310)(63997,65311)(64007,65312)(64013,65313)
(64019,65314)(64033,65315)(64037,65316)(64063,65317)(64067,65318)
(64081,65319)(64091,65320)(64109,65321)(64123,65322)(64151,65323)
(64153,65324)(64157,65325)(64171,65326)(64187,65327)(64189,65328)
(64217,65329)(64223,65330)(64231,65331)(64237,65332)(64271,65333)
(64279,65334)(64283,65335)(64301,65336)(64303,65337)(64319,65338)
(64327,65339)(64333,65340)(64373,65341)(64381,65342)(64399,65343)
(64403,65344)(64433,65345)(64439,65346)(64451,65347)(64453,65348)
(64483,65349)(64489,65350)(64499,65351)(64513,65352)(64553,65353)
(64567,65354)(64577,65355)(64579,65356)(64591,65357)(64601,65358)
(64609,65359)(64613,65360)(64621,65361)(64627,65362)(64633,65363)
(64661,65364)(64663,65365)(64667,65366)(64679,65367)(64693,65368)
(64709,65369)(64717,65370)(64747,65371)(64763,65372)(64781,65373)
(64783,65374)(64793,65375)(64811,65376)(64817,65377)(64849,65378)
(64853,65379)(64871,65380)(64877,65381)(64879,65382)(64891,65383)
(64901,65384)(64919,65385)(64921,65386)(64927,65387)(64937,65388)
(64951,65389)(64969,65390)(64997,65391)(65003,65392)(65011,65393)
(65027,65394)(65029,65395)(65033,65396)(65053,65397)(65063,65398)
(65071,65399)(65089,65400)(65099,65401)(65101,65402)(65111,65403)
(65119,65404)(65123,65405)(65129,65406)(65141,65407)(65147,65408)
(65167,65409)(65171,65410)(65173,65411)(65179,65412)(65183,65413)
(65203,65414)(65213,65415)

I claim:

1. A method of generating a parameter for a random-number generator, comprising:
   (1) using a value to select a prime number;
   (2) generating the parameter based on the selected prime number and a second prime number; and
   (3) using the parameter in the random-number generator to generate a random number.

2. The method of claim 1, wherein step 3 comprises:
   using the parameter for a linear congruential random-number generator.

3. The method of claim 2, further comprising:
   (4) passing an output of the linear congruential random-number generator through a block encryptor.

4. The method of claim 3, further comprising:
   (5) using an output of the random number generator to establish a pseudo-randomly selected network address that is used to transmit a digital computer message.

5. The method of claim 1, further comprising:
   (4) using an output of the random number generator to establish a pseudo-randomly selected network address that is used to transmit a digital computer message.

6. The method of claim 1, wherein the second prime number comprises a previously selected prime number.

7. The method of claim 6, wherein step (2) comprises generating the parameter by multiplying the selected prime number by the second prime number.

8. The method of claim 7, further comprising repeating steps (1) through (2) a plurality of times while the parameter is less than a predetermined value, wherein the parameter generated during each iteration of steps (1) through (2) is a product of a most recently selected one of the selected prime numbers and previously selected prime numbers.

9. The method of claim 1, wherein step (1) comprises mapping the generated value to the prime number based on a nonlinear distribution function.

10. The method of claim 1, wherein act 1 comprises:
    searching through an ordered table of entries, each of the entries including a prime number and a weight, a respective prime number from one of the entries being selected based on the parameter and a corresponding one of the weights.

11. The method of claim 1, further comprising repeating steps (1)-(3) for a plurality of random number generators.

12. A method of generating a parameter for a random-number generator, comprising:
    (1) using a first value to select a first prime number P;
    (2) generating a second value;
    (3) using the second value to select a number K such that PK is at most equal to a predetermined maximum number;
    (4) generating the parameter as a function of PK; and
    (5) using the parameter the random-number generator to generate a random number.

13. The method of claim 12, further comprising:
    (6) generating a third value;
    (7) using the third value to select a second prime number;
    (8) generating a second parameter by multiplying the selected second prime number by at least one previously selected prime number; and
    (9) using the parameter and the second parameter as parameters for the random-number generator.

14. The method of claim 13, wherein the random-number generator is a linear-congruential random-number generator.

15. The method of claim 14, further comprising:
(10) passing an output of the linear congruential random-number generator through a block encryptor.

16. The method of claim 15, further comprising:
(11) using an output of the linear congruential random-number generator to establish a pseudo-randomly selected network address that is used to transmit a digital computer message.

17. The method of claim 13, further comprising repeating acts (6) through (8) a plurality of times while the second parameter is less than a predetermined value, wherein the second parameter generated during each iteration of acts (6) through (8) is a product of a most recently selected one of the selected prime numbers and previously selected prime numbers.

18. The method of claim 12, wherein act 5 comprises:
using the parameter for a linear congruential random-number generator.

19. The method of claim 18, further comprising:
(6) passing an output of the linear congruential random-number generator through a block encryptor.

20. The method of claim 19, further comprising:
(7) using an output of the linear congruential random-number generator to establish a pseudo-randomly selected network address that is used to transmit a digital computer message.

21. The method of claim 12, wherein act 1 comprises:
searching through an ordered table of entries, each of the entries including a prime number and a weight, a respective prime number from one of the entries being selected based on the first parameter and a corresponding one of the weights.

22. The method of claim 12, wherein step (2) comprises generating a random value.

23. The method of claim 13, wherein step (6) comprises generating a random value.

24. One or more computer readable media storing computer executable instructions for performing a method for generating a parameter for a random-number generator, the method comprising steps of:
mapping a random value to a prime number P; and
generating the parameter by multiplying the prime number P by at least one previously selected prime number.

25. The computer readable media of claim 24, wherein the method further comprising passing the parameter to a linear congruential random-number generator to generate a random number as output.

26. The computer readable media of claim 25, wherein the method further comprises the step of passing the output of the linear congruential random-number generator through a block encryptor.

27. The computer readable media of claim 24, wherein the mapping step comprises searching through an ordered table of entries, each of the entries including a prime number and a weight, a respective prime number from one of the entries being selected based on the random value and a corresponding one of the weights.

28. One or more computer readable media storing computer executable instructions for performing a method for generating a parameter for a random-number generator, the method comprising steps of:
mapping a random value to a prime number P;
mapping a second random value to a number K such that PK is at most equal to a predetermined maximum number; and
generating a parameter as a function of PK.

29. The computer readable media of claim 28, wherein the method further comprises the step of passing the parameter to a linear congruential random-number generator to generate a random number as output.

30. The computer readable media of claim 29, wherein the method further comprises the step of passing the output of the linear congruential random-number generator through a block encryptor.

31. The computer readable media of claim 28, wherein the first mapping step comprises searching through an ordered table of entries, each of the entries including a prime number and a weight, a respective prime number from one of the entries being selected based on the random value and a corresponding one of the weights.

32. A machine-readable medium having information including instructions for a processor recorded thereon, the instructions comprising:
(1) using a first random value to select a prime number;
(2) generating a parameter based on the selected prime number and a second prime number; and
(3) using the parameter in a random number generator to generate a second random value.

33. The machine-readable medium of claim 32, wherein step 3 comprises:
using the parameter for a linear congruential random-number generator.

34. The machine-readable medium of claim 33, further having instructions comprising:
(4) passing an output of the linear congruential random-number generator through a block encryptor.

35. The machine-readable medium of claim 34, further having instructions comprising:
(5) using an output of the linear congruential random-number generator to establish a pseudo-randomly selected network address that is used to transmit a digital computer message.

36. The machine-readable medium of claim 32 further having instructions comprising:
(4) using an output of the random-number generator to establish a pseudo-randomly selected network address that is used to transmit a digital computer message.

37. The machine-readable medium of claim 36, further having instructions comprising repeating steps (1) through (2) a plurality of times while the parameter is less than a predetermined value, wherein the parameter generated during each iteration of steps (1) through (2) is a product of a most recently selected one of the selected prime numbers and previously selected prime numbers.

38. The machine-readable medium of claim 32, wherein act 1 comprises:
searching through an ordered table of entries, each of the entries including a prime number and a weight, a respective prime number from one of the entries being selected based on the random value and a corresponding one of the weights.

39. The machine-readable medium of claim 32, wherein the second prime number comprises a previously selected prime number.

* * * * *